(12) United States Patent
Ito et al.

(10) Patent No.: US 10,907,685 B2
(45) Date of Patent: *Feb. 2, 2021

(54) SINTERED BEARING AND MANUFACTURING PROCESS THEREFOR

(71) Applicant: NTN CORPORATION, Osaka (JP)

(72) Inventors: Yoshinori Ito, Aichi (JP); Tomonori Yamashita, Aichi (JP)

(73) Assignee: NTN CORPORATION, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 16/402,698

(22) Filed: May 3, 2019

(65) Prior Publication Data
US 2019/0257356 A1    Aug. 22, 2019

Related U.S. Application Data

(62) Division of application No. 15/026,134, filed as application No. PCT/JP2014/076399 on Oct. 2, 2014, now abandoned.

(30) Foreign Application Priority Data

| Oct. 3, 2013 | (JP) | 2013-208277 |
| Jan. 20, 2014 | (JP) | 2014-007911 |
| Jan. 21, 2014 | (JP) | 2014-008892 |

(51) Int. Cl.
*F16C 33/10* (2006.01)
*F16C 33/12* (2006.01)
(Continued)

(52) U.S. Cl.
CPC .......... *F16C 33/1095* (2013.01); *B22F 1/007* (2013.01); *B22F 5/106* (2013.01);
(Continued)

(58) Field of Classification Search
CPC ...... B22F 1/007; B22F 5/106; C22C 33/0207; C22C 38/16; F16C 2202/52;
(Continued)

(56) References Cited

U.S. PATENT DOCUMENTS

| 2005/0265884 A1 | 12/2005 | Shimizu et al. |
| 2014/0234152 A1 | 8/2014 | Ito et al. |
| 2018/0051747 A1* | 2/2018 | Yamashita ............ F16C 33/145 |

FOREIGN PATENT DOCUMENTS

| CA | 2 747 889 | 7/2010 |
| EP | 1 541 263 | 6/2005 |

(Continued)

OTHER PUBLICATIONS

International Search Report dated Jan. 6, 2015 in International (PCT) Application No. PCT/JP2014/076399.

(Continued)

*Primary Examiner* — Jenny R Wu
(74) *Attorney, Agent, or Firm* — Wenderoth, Lind & Ponack, L.L.P.

(57) ABSTRACT

A sintered bearing (1) contains as main components iron, copper, a metal having a lower melting point than copper, and a solid lubricant. The sintered bearing (1) includes a surface layer (S1) and a base part (S2). The surface layer (S1) is formed mainly of flat copper powder arranged so as to be thinned in a thickness direction. In the base part (S2), an iron structure (33) and a copper structure (31c) brought into contact with the iron structure are formed of partially diffusion-alloyed powder in which copper powder is partially diffused in iron powder. Thus, a sintered bearing which achieves a balance between wear resistance of a bearing surface and strength of the bearing, and realizes low cost can be provided.

11 Claims, 10 Drawing Sheets

(51) Int. Cl.
  *F16C 33/14* (2006.01)
  *C22C 33/02* (2006.01)
  *C22C 38/16* (2006.01)
  *F16C 23/04* (2006.01)
  *B22F 1/00* (2006.01)
  *B22F 5/10* (2006.01)

(52) U.S. Cl.
  CPC .......... *C22C 33/0207* (2013.01); *C22C 38/16* (2013.01); *F16C 23/041* (2013.01); *F16C 33/124* (2013.01); *F16C 33/125* (2013.01); *F16C 33/14* (2013.01); *F16C 33/145* (2013.01); *F16C 2202/52* (2013.01); *F16C 2204/10* (2013.01); *F16C 2204/60* (2013.01); *F16C 2223/42* (2013.01)

(58) Field of Classification Search
  CPC .............. F16C 2204/10; F16C 2204/60; F16C 2223/42; F16C 23/041; F16C 33/1095; F16C 33/124; F16C 33/125; F16C 33/14; F16C 33/145
  See application file for complete search history.

(56) References Cited

FOREIGN PATENT DOCUMENTS

| | | | |
|---|---|---|---|
| GB | 2220421 A * | 1/1990 | ................ B22F 3/11 |
| GB | 2 242 912 | 10/1991 | |
| GB | 2 333 779 | 8/1999 | |
| JP | 48-44108 | 6/1973 | |
| JP | 2-57251 | 4/1990 | |
| JP | 2-145703 | 6/1990 | |
| JP | 08-092604 | 4/1996 | |
| JP | 9-95759 | 4/1997 | |
| JP | 11-117044 | 4/1999 | |
| JP | 11-336761 | 12/1999 | |
| JP | 2001-123253 | 5/2001 | |
| JP | 2001-251393 | 9/2001 | |
| JP | 2002349575 A * | 12/2002 | |
| JP | 2003-120674 | 4/2003 | |
| JP | 2003-313624 | 11/2003 | |
| JP | 2004-84038 | 3/2004 | |
| JP | 2004-149708 | 5/2004 | |
| JP | 2004-292861 | 10/2004 | |
| JP | 3613569 | 1/2005 | |
| JP | 2005-179571 | 7/2005 | |
| JP | 2005-232592 | 9/2005 | |
| JP | 2010-077474 | 4/2010 | |
| JP | 2010-180331 | 8/2010 | |
| JP | 2010-276051 | 12/2010 | |
| JP | 2011-127742 | 6/2011 | |
| JP | 2012-26504 | 2/2012 | |
| JP | 2013-159795 | 8/2013 | |
| JP | 2013159795 A * | 8/2013 | |
| WO | 2014/010429 | 1/2014 | |

OTHER PUBLICATIONS

International Preliminary Report on Patentability and Written Opinion of the International Searching Authority dated Apr. 5, 2016 in International (PCT) Application No. PCT/JP2014/076399.

Extended European Search Report dated May 24, 2017 in corresponding European Patent Application No. 14850756.9.

Notice of Reason for Rejection dated Oct. 30, 2017 in corresponding Japanese Patent Application No. 2014-007911, with English-language translation.

Chinese Office Action dated Dec. 1, 2017 in corresponding Chinese Application No. 201480053495.2, with English translation of Chinese Search Report.

* cited by examiner

10,907,685 B2

SINTERED BEARING AND MANUFACTURING PROCESS THEREFOR

TECHNICAL FIELD

The present invention relates to a sintered bearing made of a sintered metal, and a method of manufacturing the sintered bearing.

BACKGROUND ART

A sintered bearing is formed of a porous body having innumerable inner pores, and is generally used in the state in which a lubricating fluid (for example, a lubricating oil) is impregnated into these inner pores. In this case, the lubricating oil retained in the inner pores of the sintered bearing seeps out onto an inner peripheral surface (bearing surface) of the sintered bearing along with an increase in temperature when the sintered bearing and a shaft inserted into its inner periphery relatively rotate. Then, with the lubricating oil thus seeping out, an oil film is formed in a bearing clearance between the bearing surface of the sintered bearing and an outer peripheral surface of the shaft, and thus the shaft is supported in a relatively rotatable manner.

For example, in the following Patent Literature 1, there is disclosed, as a copper-iron-based sintered bearing containing as main components iron and copper, a sintered bearing obtained by compacting and sintering copper-covered iron powder in which iron powder is covered with copper in an amount of 10 mass % or more and less than 30 mass % with respect to the iron powder and whose grain size is set to 80 mesh or less.

CITATION LIST

Patent Literature 1: JP 3613569 B2
Patent Literature 2: JP 02-57251 U
Patent Literature 3: JP 2012-26504 A

SUMMARY OF INVENTION

Technical Problem

However, the configuration of Patent Literature 1 has a problem of, for example, early wear of a bearing surface owing to low neck strength between an iron phase (iron structure) and a copper phase (copper structure).

It was revealed that, when the sintered bearing of Patent Literature 1 was used for a vibration motor, fluctuation in rotation increased in its long-term use. This is caused by the early wear of the bearing surface owing to insufficient neck strength between the iron structure and the copper structure.

In addition, it has been known that a plain bearing is used as a bearing configured to support a motor shaft of a starter for an automobile in a rotatable manner (Patent Literature 2). In the starter for an automobile, large torque necessary for the activation of an engine is obtained, and hence the output power of a motor is generally reduced with a reduction gear having a high speed reduction ratio, for example, a planetary gear mechanism. It has already been proposed that a sintered bearing, such as a copper-based, iron-based, or copper-iron-based sintered bearing, is press-fitted to the inner periphery of a planetary gear constituting the planetary gear mechanism, and thus the planetary gear is supported in a rotatable manner with respect to a shaft (Patent Literature 3).

Meanwhile, the starter is in a stopped state during rotation of the engine. Therefore, relative rotation between the shaft and the bearing does not occur. Accordingly, the bearing surface of the sintered bearing or a surface of the shaft facing the bearing surface is unlikely to be worn during the rotation of the engine. However, according to the investigations made by the inventors of the present invention, it was revealed that fretting wear occurred on the bearing surface of the sintered bearing or on the surface of the shaft when the engine was driven for a long period of time. A possible cause for this is as follows: vibration of the engine is transmitted to the starter during the rotation of the engine, and hence the bearing surface and the surface of the shaft are brought into contact with each other owing to the vibration to cause slight sliding, the bearing surface and the surface of the shaft are oxidized because of the sliding, and surface structures are liable to escape. In this case, when the neck strength between the iron structure and the copper structure is insufficient, the escaping of the surface structures is promoted. The fretting wear becomes more remarkable as the content of Fe in the sintered bearing increases more. Therefore, the fretting wear emerges as a problem particularly when an iron-based sintered bearing or a copper-iron-based sintered bearing having a large content of Fe is used.

When a copper-based sintered bearing is used, oxidation is less liable to occur, and hence the fretting wear can be prevented. However, the copper-based sintered bearing tends to be insufficient in strength owing to copper, which is soft in itself. Therefore, there is a risk in that the bearing surface deforms when the shaft and the bearing surface are brought into contact with each other owing to the vibration of the engine, or deformation of the sintered bearing by a reduction in diameter, which accompanies the press-fitting of the sintered bearing to the inner periphery of the housing, affects also the bearing surface, resulting in a reduction in accuracy of the bearing surface.

As described above, the copper-based sintered bearing is advantageous in terms of sliding characteristics including an initial running-in property and quietness, but has a problem in terms of its strength. In contrast, the iron-based sintered bearing and the copper-iron-based sintered bearing having a large content of Fe are advantageous in terms of their strength, but have problems in terms of sliding characteristics (as already described, there is a risk of the fretting wear depending on use conditions). As described above, it is difficult for the existing sintered bearings to fully satisfy the sliding characteristics, the strength of the bearing, the wear resistance, and the like, and there is a demand for a sintered bearing satisfying those demanded characteristics at high levels so that the applications of the sintered bearing are widened.

Thus, an object of the present invention is to provide a sintered bearing which has good sliding characteristics, can achieve a balance between wear resistance of a bearing surface and strength of the bearing, and can realize a reduction in cost, and a method of manufacturing the sintered bearing.

Solution to Problem

In order to achieve the above-mentioned object, according to one embodiment of the present invention, there is provided a sintered bearing, which contains as main components iron, copper, a metal having a lower melting point than copper, and a solid lubricant, the sintered bearing comprising: a base part containing an iron structure and a copper structure; and a surface layer covering a surface of the base part, wherein: the surface layer is formed mainly of flat copper powder arranged so as to be thinned in a thickness direction; and at least part of the iron structure and the copper structure in the base part is formed of partially diffusion-alloyed powder in which copper powder is partially diffused in iron powder.

The flat copper powder has a property of adhering onto a molding surface at the time of molding raw material powders. Therefore, a green compact obtained after the molding contains a large amount of copper in its surface layer. As a result, the surface layer having a large content of copper is formed in a sintered compact obtained after sintering (it is preferred that a copper structure be formed on a surface of the surface layer at an area ratio of 60% or more). The surface layer increased in content of copper as described above can realize improvements in initial running-in property and quietness, and can provide good sliding characteristics in combination with an action of the solid lubricant, such as graphite. In addition, aggressiveness to a shaft is reduced as well, and hence durability life is prolonged. Besides, a copper-rich bearing surface less susceptible to oxidation is formed, and hence fretting wear of the bearing surface can be prevented.

The sintered bearing comprises the low-melting point metal, and hence, the copper structure brought into contact with the iron structure in the base part basically has a structure in which the low-melting point metal is diffused in the copper powder. The low-melting point metal wets the surface of copper and progresses liquid phase sintering at the time of sintering, and hence a bonding force between metal grains can be increased particularly in the base part. In addition, the base part is basically formed of the partially diffusion-alloyed powder in which part of copper powder is diffused in iron powder, and hence high neck strength is obtained between the copper structure (structure containing as a main component copper) and the iron structure (structure containing as a main component iron) after the sintering. Thus, the copper structure and the iron structure are prevented from escaping from the bearing surface, and the wear resistance of the bearing surface can be enhanced. In addition, the strength of the bearing can be increased. As a result, even when the sintered bearing is press-fitted and fixed to an inner periphery of a housing, the bearing surface does not deform in accordance with the shape of an inner peripheral surface of the housing, and a bearing surface having high accuracy can be realized. In addition, a base of the bearing surface is strengthened, and hence deformation of the bearing surface can be suppressed when a shaft is brought into contact with the bearing surface owing to vibration or the like. Accordingly, the sintered bearing suitable for use in a starter configured to activate an engine (including a reduction gear or the like incorporated in the inside of the starter) or use in a vibration motor to be used in a mobile terminal or the like can be provided. The ratio of copper is preferably 10 wt % or more and 30 wt % or less in the partially diffusion-alloyed powder.

When a green compact comprising the flat copper powder and the low-melting point metal is sintered, there is a fear that the flat copper powder is spheroidized. In the present invention, the partially diffusion-alloyed powder in which part of copper powder is diffused in iron powder is used, and hence a number of grains of copper powder are present around the low-melting point metal at the time of sintering. In this case, the low-melting point metal melting with an increase in temperature at the time of sintering diffuses in the copper powder in the partially diffusion-alloyed powder ahead of the flat copper powder. Thus, an influence of the low-melting point metal powder on the flat copper powder in the surface layer can be suppressed. Accordingly, the spheroidization of the flat copper powder in the surface layer can be prevented, and the concentration of copper in the surface of the surface layer can be increased.

The iron structure and the copper structure in the base part may be entirely formed of the partially diffusion-alloyed powder, or may be formed of: the partially diffusion-alloyed powder; and any one or both of elemental iron powder and elemental copper powder.

In combination use of the flat copper powder and the low-melting point metal, it is existing common general technical knowledge that the content of the low-melting point metal needs to be less than 10 wt % with respect to the flat copper powder in order to minimize the spheroidization effect. In contrast, in the present invention, the spheroidization of the flat copper powder in the surface layer caused by the low-melting point metal can be suppressed as described above, and hence the content of the low-melting point metal can be increased in the bearing. Such increase in content of the low-melting point metal leads to a further increase in bonding force between metal grains, and hence is effective for an increase in strength of the bearing. Specifically, the low-melting point metal may be contained at a weight ratio of 10 wt % or more and 30 wt % or less with respect to the flat copper powder.

The iron structure may be formed (only) of a ferrite phase or may be formed of the ferrite phase and a pearlite phase present at a grain boundary of the ferrite phase. In the former case, even when the base part containing the iron structure in a large amount is exposed owing to wear of the surface layer, the aggressiveness to a shaft can be reduced by virtue of the iron structure formed mainly of the ferrite phase even when the content of copper is small. Thus, durability is increased. In the latter case, the hard pearlite phase compensates for the wear resistance of the ferrite phase, and hence the wear of the bearing surface can be suppressed. In the latter case, when the presence ratio of pearlite is excessively high, the aggressiveness to a shaft is increased, and the shaft is liable to wear. From such viewpoint, the amount of the pearlite phase is set to the extent that the pearlite phase is present (in a scattered manner) at the grain boundary of the ferrite phase (see FIG. 9). The sintered bearing is preferably impregnated with a lubricating oil having a kinematic viscosity of 30 mm$^2$/sec or more and 200 mm$^2$/sec or less.

The sintered bearing described above may be manufactured by: mixing the partially diffusion-alloyed powder in which copper powder is partially diffused in iron powder, the flat copper powder, metal powder having a lower melting point than copper, and solid lubricant powder; forming a green compact with the resultant mixed powder; and sintering the green compact at a temperature lower than a melting point of copper.

Advantageous Effects of Invention

According to the embodiment of the present invention, the sintered bearing which has good sliding characteristics, achieves a balance between wear resistance of a bearing surface and strength of the bearing, and realizes a reduction in cost can be provided.

DESCRIPTION OF EMBODIMENTS

Now, a first embodiment of the present invention is described with reference to the accompanying drawings.

Figure 1:
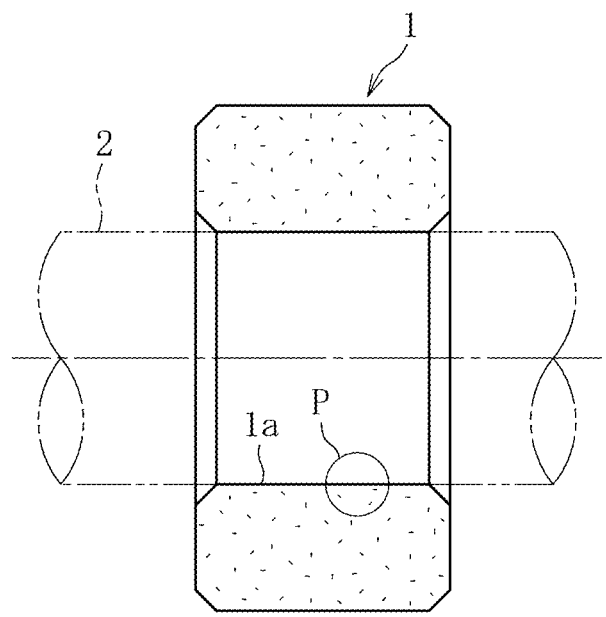
FIG. 1 is a sectional view of a sintered bearing according to the present invention.

As illustrated in FIG. 1, a sintered bearing 1 is formed into a cylindrical shape having a bearing surface 1a on an inner periphery thereof. The sintered bearing 1 of this embodiment is used by impregnating a lubricating oil into inner pores of a porous sintered compact (also called an oil-impregnated sintered bearing). A shaft 2 made of stainless steel or the like is inserted into the inner periphery of the sintered bearing 1, and the shaft or the bearing 1 is rotated in this state. Then, the lubricating oil retained in innumerable pores of the sintered bearing 1 seeps out onto the bearing surface 1a along with temperature rise. Due to the lubricating oil thus seeping out, an oil film is formed in a bearing clearance between an outer peripheral surface of the shaft and the bearing surface 1a, and thus the shaft 2 is supported by the bearing 1 in a relatively rotatable manner.

Figure 2:
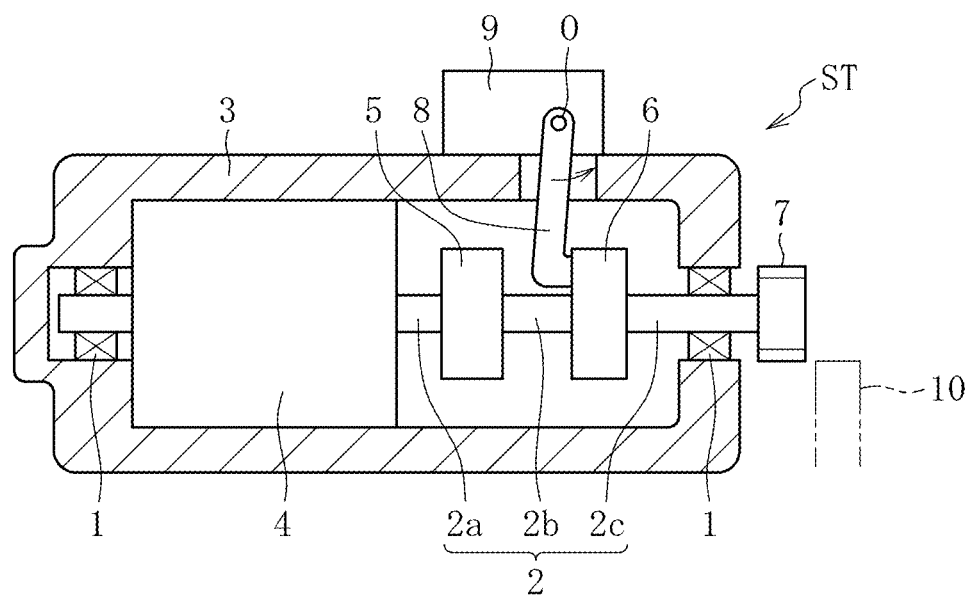
FIG. 2 is a sectional view for illustrating a typical configuration of a starter in a simplified manner.

A typical configuration of a starter ST to be used for activating an engine for an automobile is illustrated in FIG. 2 in a simplified manner. As illustrated in FIG. 2, the starter ST comprises as main constituent elements a housing 3, a motor part 4 comprising a motor shaft 2a, a reduction gear 5 comprising an output shaft 2b, an overrunning clutch 6 comprising an output shaft 2c, a pinion gear 7, a shift lever 8, and an electromagnetic switch 9. The shift lever 8 is rotatable about a pivot point O, and its tip is arranged in the back of the overrunning clutch 6 (input side). The overrunning clutch 6 is a one-way clutch, and the output shaft 2b of the reduction gear 5 is connected thereto on the input side so as to be slidable in a shaft direction through a spline or the like. The pinion gear 7 is mounted to the output shaft 2c of the overrunning clutch 6, and the overrunning clutch 6 is movable in the shaft direction integrally with the output shaft 2c and the pinion gear 7.

When ignition is turned on, the motor part 4 is driven, and the torque of the motor shaft 2a is transmitted to the pinion gear 7 through the reduction gear 5 and the overrunning clutch 6. In addition, the electromagnetic switch 9 is turned on to provide torque in a direction indicated by the arrow of the figure to the shift lever 8, and the overrunning clutch 6 and the pinion gear 7 integrally move forward. With this, the pinion gear 7 is engaged with a ring gear 10 connected to a crankshaft, and the torque of the motor part 4 is transmitted to the crankshaft to activate an engine. After the activation of the engine, the electromagnetic switch 9 is turned off, the overrunning clutch 6 and the pinion gear 7 move backward, and the pinion gear 7 separates from the ring gear 10. The torque of the engine immediately after its activation is not transmitted to the motor part 4 because the torque is shut off through the overrunning clutch 6.

The sintered bearing 1 of the present invention is press-fitted and fixed to the inner periphery of the housing 3 or the like in the starter ST described above, and is configured to support various shafts 2 (2a to 2c) in the starter ST (illustrated in FIG. 2 is the case where the sintered bearing 1 is configured to support the motor shaft 2a and the output shaft 2c of the overrunning clutch 6). The sintered bearing 1 may be used for supporting a gear of the reduction gear 5, while detailed illustration is omitted. For example, when the reduction gear 5 has a planetary gear mechanism, the sintered bearing 1 of the present invention is press-fitted to the inner periphery of a planetary gear configured to rotate with respect to a shaft, and thus the planetary gear can be supported so as to be rotatable with respect to the shaft.

The sintered bearing 1 described above is formed by loading, into a mold, raw material powders obtained by mixing various powders, and compressing the raw material powders to form a green compact, followed by sintering the green compact.

The raw material powders are mixed powders containing as main components partially diffusion-alloyed powder, flat copper powder, low-melting point metal powder, and solid lubricant powder. Various molding aids as typified by a lubricant (such as a metal soap) for improving mold releasability are added to the mixed powder as necessary. Now, detailed description is given of raw material powders and a manufacturing procedure for the sintered bearing 1 according to the first embodiment.

[Partially Diffusion-Alloyed Powder]

Figure 3:
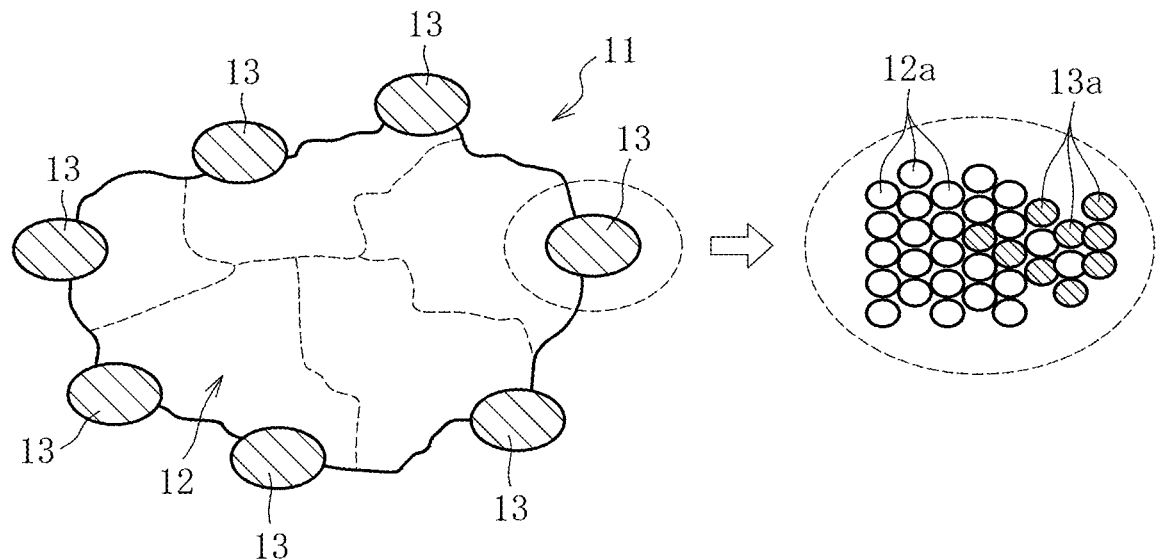
FIG. 3 are enlarged views for schematically illustrating partially diffusion-alloyed powder.

As illustrating in FIG. 3, an Fe—Cu partially diffusion-alloyed powder 11 in which a number of grains of copper powder 13 are partially diffused on the surface of an iron powder 12 is used as the partially diffusion-alloyed powder. A partial diffusion portion of the partially diffusion-alloyed powder 11 forms an Fe—Cu alloy, and the alloy portion has a crystalline structure in which iron atoms 12a and copper atoms 13a are bonded to each other and arranged as illustrated in a partial enlarged view of FIG. 3. The partially diffusion-alloyed powder 11 to be used preferably has an average grain diameter of from 75 μm to 212 μm.

As the iron powder 12 constituting the partially diffusion-alloyed powder 11, reduced iron powder, atomized iron powder, or other known iron powders may be used. In this embodiment, the reduced iron powder is used. The reduced iron powder has a substantially spherical but irregular shape. Further, the reduced iron powder has a sponge-like shape (porous shape) having inner pores, and hence the reduced iron powder is also called sponge iron powder. The iron powder 12 to be used has an average grain diameter of preferably from 45 μm to 150 μm, more preferably from 63 μm to 106 μm.

It should be noted that the average grain diameter may be measured by a laser diffraction scattering method (for example, using SALD-31000 manufactured by Shimadzu Corporation) involving radiating laser light to grains, and calculating a grain size distribution and the average grain diameter from an intensity distribution pattern of diffracted/scattered light emitted therefrom (the average grain diameters of powders described below may be measured by the same method).

In addition, as the copper powder 13 constituting the partially diffusion-alloyed powder 11, generally-used irregular or dendritic copper powder may be used widely. For example, electrolytic copper powder, atomized copper powder, or the like is used. In this embodiment, the atomized copper powder, which has a number of irregularities on its surface, has a substantially spherical but irregular shape in the entirety of its grain, and is excellent in formability, is used. The copper powder 13 to be used has a grain diameter smaller than that of the iron powder 12, specifically has an average grain diameter of 5 μm or more and 45 μm or less. It should be noted that the ratio of Cu in the partially diffusion-alloyed powder 11 is from 10 wt % to 30 wt % (preferably from 22 wt % to 26 wt %).

[Flat Copper Powder]

Figure 4:
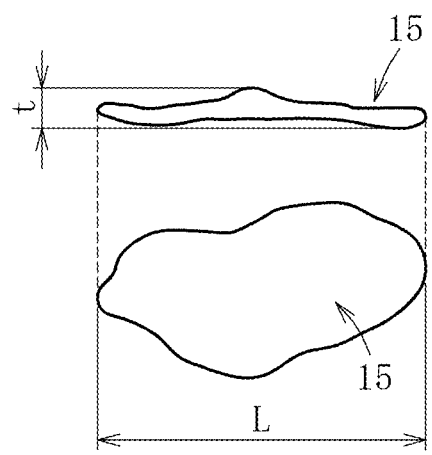
FIG. 4 is an illustration of flat copper powder in side view on an upper side and in plan view on a lower side.

The flat copper powder is obtained by flattening raw material copper powder containing water-atomized powder and the like through stamping. As the flat copper powder, there is mainly used flat copper powder having a length L of from 20 μm to 80 μm and a thickness t of from 0.5 μm to 1.5 μm (aspect ratio L/t=13.3 to 160). The "length" and the "thickness" herein refer to the maximum geometric dimensions of individual grains of flat copper powder 15 as illustrated in FIG. 4. The apparent density of the flat copper powder is set to 1.0 g/cm³ or less. When the flat copper powder having the above-mentioned size and apparent density is used, the force of adhesion of the flat copper powder to the molding surface is increased, and hence a large amount of flat copper powder can be caused to adhere onto the molding surface.

[Fluid Lubricant]

In order to cause the flat copper powder to adhere onto the molding surface, a fluid lubricant is caused to adhere to the flat copper powder in advance. The fluid lubricant only needs to be adhered to the flat copper powder before loading the raw material powders into the mold. Specifically, the fluid lubricant is caused to adhere to the raw material copper powder preferably before mixing the raw material powders, further preferably in the stage of stamping the raw material copper powder. The fluid lubricant may be caused to adhere to the flat copper powder by means of, for example, feeding the fluid lubricant to the flat copper powder and agitating the fluid lubricant and the flat copper powder within a period after stamping the raw material copper powder until mixing the flat copper powder with other raw material powders. In order to secure the amount of adhesion of the flat copper powder onto the molding surface, the blending ratio of the fluid lubricant to the flat copper powder is set to 0.1 wt % or more in terms of a weight ratio. Further, in order to prevent coagulation due to the adhesion of grains of the flat copper powder to each other, the blending ratio is set to 0.8 wt % or less. It is desired that the lower limit of the blending ratio be set to 0.2 wt % or more, and the upper limit of the blending ratio be set to 0.7 wt %. As the fluid lubricant, a fatty acid, in particular, a linear saturated fatty acid is preferred. This kind of fatty acid is expressed by a general formula of $C_{n-1}H_{2n-1}COOH$. As this fatty acid, a fatty acid having Cn within a range of from 12 to 22 may be used, and stearic acid may be used as a specific example.

[Low-Melting Point Metal Powder]

The low-melting point metal powder is metal powder having a lower melting point than copper. In the present invention, metal powder having a melting point of 700° C. or less is used, and powder of tin, zinc, or phosphorus is used as an example. Among others, it is preferred to use tin that is less evaporated at the time of sintering. The average grain diameter of the low-melting point metal powder is preferably set to from 5 μm to 45 μm so as to be smaller than that of the partially diffusion-alloyed powder 11. Those low-melting point metal powders have high wettability to copper. When the low-melting point metal powder is blended in the raw material powders, the low-melting point metal powder melts first at the time of sintering to wet the surface of the copper powder, and then diffuses into copper to allow copper to melt. Liquid phase sintering is progressed with an alloy of the molten copper and low-melting point metal, with the result that the bonding strength between respective iron grains, the bonding strength between iron grains and copper grains, and the bonding strength between respective copper grains are increased.

[Solid Lubricant Powder]

The solid lubricant powder is added so as to reduce friction at the time of metal contact due to sliding between the sintered bearing 1 and the shaft 2, and graphite is used as an example. As graphite powder in this case, it is desired to use flake graphite powder so as to attain adhesiveness to the flat copper powder. As the solid lubricant powder, molybdenum disulfide powder may be used as well as the graphite powder. The molybdenum disulfide powder has a layered crystal structure, and is peeled in a layered shape. Thus, the adhesiveness to the flat copper powder is attained similarly to flake graphite.

[Blending Ratio]

In order to obtain the raw material powders having the above-mentioned powders blended together, it is preferred to blend the partially diffusion-alloyed powder at from 75 wt % to 90 wt %, the flat copper powder at from 8 wt % to 20 wt %, the low-melting point metal powder (for example, tin powder) at from 0.8 wt % to 6.0 wt %, and the solid lubricant powder (for example, graphite powder) at from 0.5 wt % to 2.0 wt %. The reason for such blending ratio is given below.

In the present invention, as described later, the flat copper powder is caused to adhere in a layered shape to the mold at the time of loading the raw material powders into the mold. When the blending ratio of flat copper in the raw material powders is less than 8 wt %, the amount of adhesion of flat copper to the mold becomes insufficient, and hence the actions and effects of the present invention cannot be expected. In addition, the amount of adhesion of the flat copper powder to the mold is saturated at about 20 wt %. A further increase in blending amount of the flat copper powder poses a problem of increasing cost owing to the use of the costly flat copper powder. When the ratio of the low-melting point metal powder is less than 0.8 wt %, the strength of the bearing cannot be secured. When the ratio of the low-melting point metal powder exceeds 6.0 wt %, the spheroidization effect on the flat copper powder cannot be ignored. In addition, when the ratio of the solid lubricant powder is less than 0.5 wt %, the effect of reducing the friction on the bearing surface is not obtained. When the ratio of the solid lubricant powder exceeds 2.0 wt %, a reduction in strength or the like occurs.

[Mixing]

Figure 5:
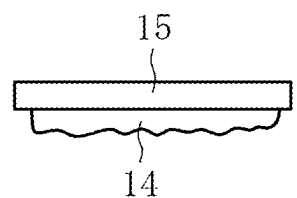
FIG. 5 is a side view for illustrating the flat copper powder and flake graphite that adhere to each other.

It is desired that the above-mentioned powders be mixed through two separate operations. First, as primary mixing, flake graphite powder and flat copper powder having a fluid lubricant caused to adhere thereto in advance are mixed together with a known mixer. Subsequently, as secondary mixing, partially diffusion-alloyed powder and low-melting point metal powder are added to and mixed with the primarily-mixed powder, and graphite powder is further added and mixed as necessary. The flat copper powder has a low apparent density among the various raw material powders, and is therefore difficult to uniformly disperse in the raw material powders. Thus, when the flat copper powder and the graphite powder having an apparent density at the same level are mixed together in advance through the primary mixing, as illustrated in FIG. 5, flat copper powder 15 and graphite powder 14 are caused to adhere to each other and superimposed in a layered shape due to, for example, the fluid lubricant adhering to the flat copper powder, and accordingly the apparent density of the flat copper powder is increased. Therefore, the flat copper powder can be dispersed uniformly in the raw material powders at the time of secondary mixing. When a lubricant is separately added at the time of primary mixing, the adhesion between the flat copper powder and the graphite powder is further promoted, and hence the flat copper powder can be dispersed more uniformly at the time of secondary mixing. As the lubricant to be added in this case, a fluid lubricant of the same kind as or the different kind from the above-mentioned fluid lubricant may be used, and a powder lubricant may be used as well. For example, the above-mentioned molding aid such as a metal soap is generally powdery, but has an adhesion force to some extent so that the adhesion between the flat copper powder and the graphite powder can further be promoted.

The adhesion state between the flat copper powder 15 and the flake graphite powder 14 as illustrated in FIG. 5 is maintained to some extent even after the secondary mixing, and hence, when the raw material powders are loaded into the mold, a large amount of graphite powder is caused to adhere onto the surface of the mold together with the flat copper powder.

[Molding]

Figure 6:
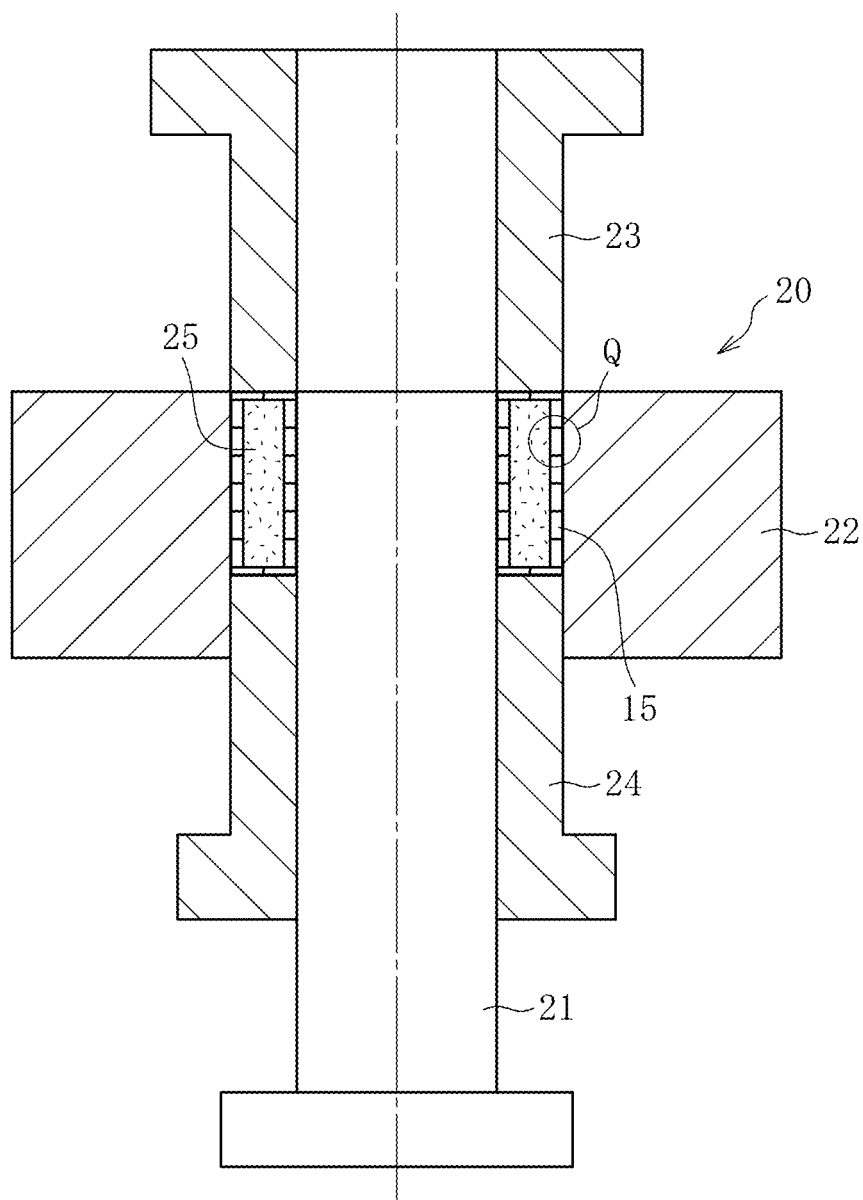
FIG. 6 is a sectional view for illustrating a step of forming a green compact through use of a mold.

The raw material powders obtained after the secondary mixing are fed to a mold 20 of a molding machine. As illustrated in FIG. 6, the mold 20 is constructed of a core 21, a die 22, an upper punch 23, and a lower punch 24, and the raw material powders are loaded into a cavity defined by those components of the mold 20. When the upper and lower punches 23 and 24 are brought close to each other to compress the raw material powders, the raw material powders are molded by a molding surface defined by an outer peripheral surface of the core 21, an inner peripheral surface of the die 22, an end surface of the upper punch 23, and an end surface of the lower punch 24, to thereby obtain a cylindrical green compact 25.

Among the metal powders of the raw material powders, the flat copper powder has the lowest apparent density. Further, the flat copper powder has a foil-like shape with the above-mentioned length L and thickness t, and its wider surface has a large area per unit weight. Therefore, the flat copper powder 15 is easily affected by the adhesion force that is generated due to the fluid lubricant adhering onto the surface of the flat copper powder, and further by the Coulomb force or the like. After loading the raw material powders into the mold 20, as illustrated in an enlarged manner in FIG. 7 (enlarged view of the region Q in FIG. 6), the flat copper powder 15 is caused to adhere to the entire region of a molding surface 20a of the mold 20 with its wider surface opposed to the molding surface 20a under a layered state in which a plurality of layers (approximately one to three layers) of the flat copper powder 15 are superimposed. At this time, flake graphite adhering to the flat copper powder 15 is also caused to adhere onto the molding surface 20a of the mold together with the flat copper powder 15 (illustration of graphite is omitted in FIG. 7). In an inner region of the layered structure of the flat copper 15 (region close to the center of the cavity), on the other hand, the partially diffusion-alloyed powder 11, the flat copper powder 15, low-melting point metal powder 16, and graphite powder are brought into a state of being dispersed uniformly as a whole. In the green compact 25 obtained after the molding, the distribution state of those powders is maintained substantially as it is.

[Sintering]

After that, the green compact 25 is sintered in a sintering furnace. In this embodiment, the sintering conditions are determined so that an iron structure becomes a two-phase structure containing a ferrite phase and a pearlite phase. When the iron structure is formed of the two-phase structure containing a ferrite phase and a pearlite phase, the hard pearlite phase contributes to improvement in wear resistance, and the wear of the bearing surface is suppressed under high surface pressure. As a result, the life of the bearing can be prolonged.

When the presence ratio of pearlite ($\gamma$Fe) becomes excessively high through diffusion of carbon to reach a ratio comparable to or higher than that of ferrite ($\alpha$Fe), the aggressiveness to the shaft due to pearlite is increased significantly, and hence the shaft is liable to be worn. In order to prevent this phenomenon, the amount of the pearlite phase ($\gamma$Fe) is suppressed to the extent that the pearlite phase ($\gamma$Fe) is present (in a scattered manner) at a grain boundary of the ferrite phase ($\alpha$Fe) (see FIG. 9). The "grain boundary" herein refers to not only a grain boundary formed between powder grains but also a crystal grain boundary 18 formed in the powder grains. When the iron structure is formed of the two-phase structure containing a ferrite phase ($\alpha$Fe) and a pearlite phase ($\gamma$Fe) as described above, the ratios of the ferrite phase ($\alpha$Fe) and the pearlite phase ($\gamma$Fe) in the iron structure are desirably from about 80% to about 95% and from about 5% to about 20%, respectively ($\alpha$Fe:$\gamma$Fe=80%-95%:5%-20%), in terms of an area ratio in an arbitrary cross section of a base part S2 described below. With this, a balance between suppression of the wear of the shaft 2 and improvement in wear resistance of the bearing surface 1a can be achieved.

The growth rate of pearlite mainly depends on a sintering temperature. Thus, it order that the pearlite phase be present at the grain boundary of the ferrite phase in the above-mentioned manner, the sintering is performed at a sintering temperature (furnace atmosphere temperature) of from about 820° C. to about 900° C. through use of a gas containing carbon, such as a natural gas or an endothermic gas (RX gas), as a furnace atmosphere. With this, carbon contained in the gas diffuses into iron at the time of sintering, with the result that the pearlite phase (γFe) can be formed. It should be noted that sintering at a temperature higher than 900° C. is not preferred because, through such sintering, carbon in the graphite powder reacts with iron, with the result that the pearlite phase increases more than necessary. Along with the sintering, the fluid lubricant, other lubricants, and various molding aids described above burn in the inside of the sintered compact, or vapor from the inside of the sintered compact.

Through the above-mentioned sintering step, a porous sintered compact is obtained. Sizing is carried out on this sintered compact, and a lubricating oil or liquid grease is further impregnated into the sintered compact by a method involving vacuum pressure impregnation or the like, to thereby complete the sintered bearing 1 (oil-impregnated sintered bearing) illustrated in FIG. 1. The lubricating oil impregnated into the sintered compact is retained not only in pores formed between grains in sintered structures but also in pores in the reduced iron powder in the partially diffusion-alloyed powder. The lubricating oil to be impregnated into the sintered compact preferably has a kinematic viscosity of 30 mm$^2$/sec or more and 200 mm$^2$/sec or less. It should be noted that, depending on applications, the step of impregnating a lubricating oil may be omitted so that the sintered bearing 1 is used under an oil-less condition.

Figure 8:
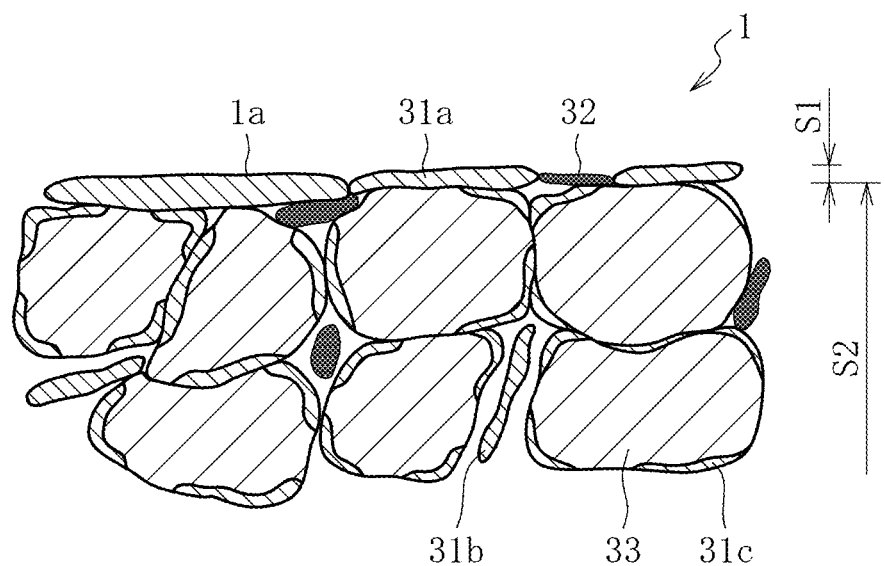
FIG. 8 is an enlarged view of the sintered bearing (region P in FIG. 1) in a cross section in a radial direction.

A microscopic structure of the sintered bearing 1 after the above-mentioned manufacturing steps in the vicinity of its surface (region P in FIG. 1) is schematically illustrated in FIG. 8.

Figure 7:
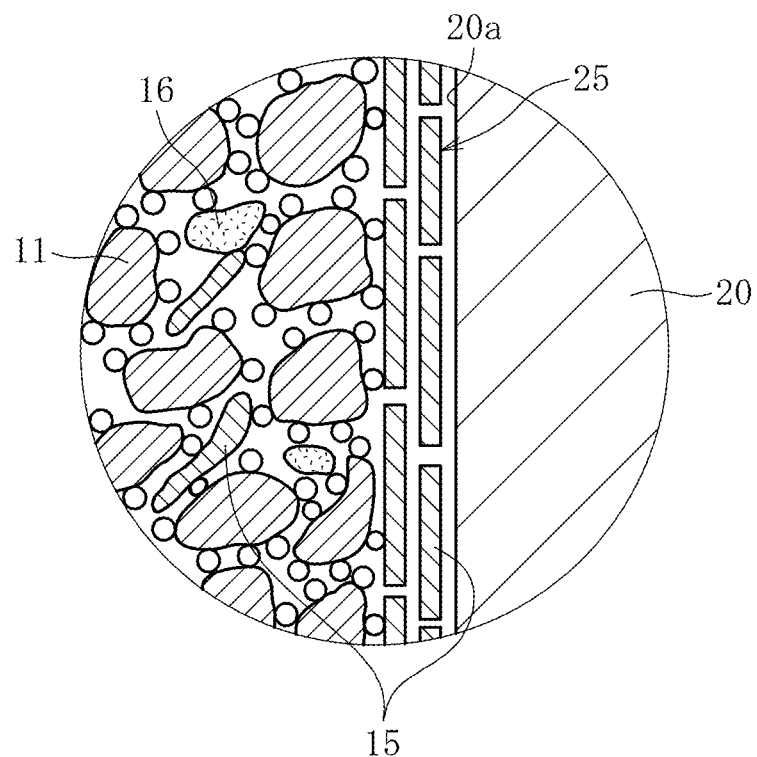
FIG. 7 is an enlarged sectional view for illustrating the region Q in FIG. 6.

As illustrated in FIG. 8, in the sintered bearing 1 of the present invention, the green compact 25 is formed under a state in which the flat copper powder 15 is caused to adhere in a layered shape to the molding surface 20a (see FIG. 7). Further, deriving from the fact that such flat copper powder 15 is sintered, a surface layer S1 having a concentration of copper higher than those in other portions is formed in the entire surface of the bearing 1 including the bearing surface 1a. Besides, the wider surface of the flat copper powder 15 is caused to adhere onto the molding surface 20a, and hence many of copper structures 31a of the surface layer S1 have such a flat shape that each copper structure 31a is thinned in a thickness direction of the surface layer S1. The thickness of the surface layer S1 corresponds to the thickness of a layer of the flat copper powder adhering in a layered shape to the molding surface 20a, and is approximately from about 1 μm to about 6 μm. The surface of the surface layer S1 is formed mainly of free graphite 32 (represented by solid black) in addition to the copper structure 31a, and the rest is formed of openings of pores and an iron structure described below. Of those, the copper structure 31a has the largest area, and specifically, the copper structure 31a occupies an area of 60% or more of the surface.

On the other hand, in a base part S2 which is covered with the surface layer S1 and located inside, two kinds of copper structures (31b and 31c), an iron structure 33, free graphite 32, and pores are formed. The one copper structure 31b (first copper structure) is formed resulting from the flat copper powder 15 in the inside of the green compact 25, and has a flat shape corresponding to the flat copper powder. The other copper structure 31c (second copper structure) is formed through diffusion of the low-melting point metal into the copper powder 13 constituting the partially diffusion-alloyed powder 11, and is formed so as to be brought into contact with the iron structure 33. The second copper structure 31c plays a role in increasing a bonding force between grains as described below.

Figure 9:
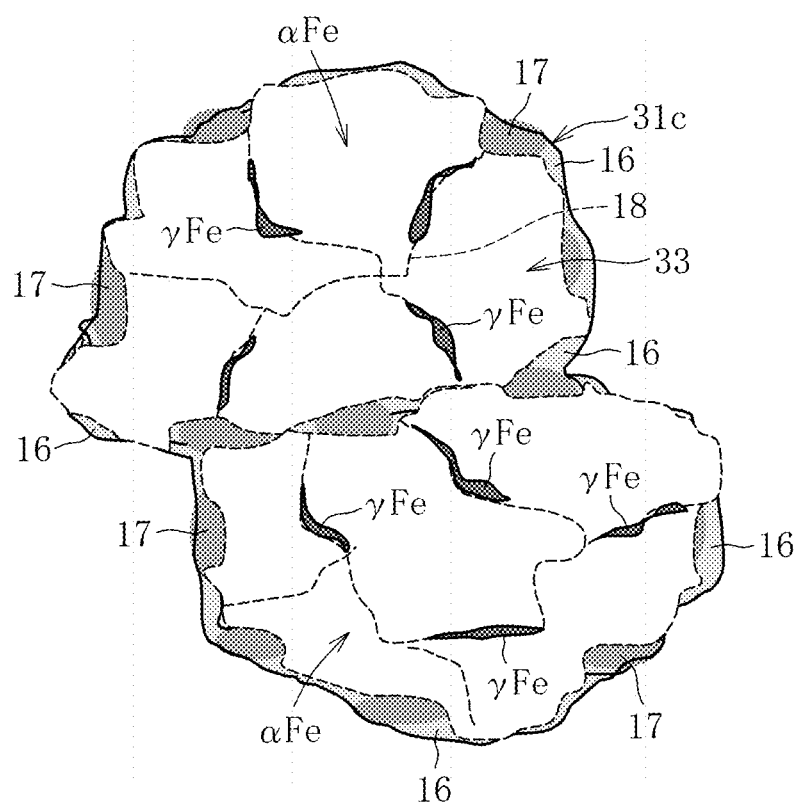
FIG. 9 is an enlarged view for illustrating an iron structure and its surrounding structures of FIG. 8.

FIG. 9 is an enlarged illustration of the iron structure 33 and its surrounding structures after the sintering illustrated in FIG. 8. As illustrated in FIG. 9, tin serving as the low-melting point metal melts first at the time of sintering to diffuse into the copper powder 13 constituting the partially diffusion-alloyed powder 11 (see FIG. 3), and thus forms a bronze phase 16 (Cu—Sn). Liquid phase sintering is progressed through the bronze phase 16, with the result that the respective iron grains, the iron grains and the copper grains, or the respective copper grains are firmly bonded to each other. In addition, in the individual partially diffusion-alloyed powder 11, molten tin diffuses also into a portion in which part of the copper powder 13 diffuses to form an Fe—Cu alloy, and thus forms an Fe—Cu—Sn alloy (alloy phase 17). The bronze phase 16 and the alloy phase 17 form the second copper structure 31c in combination. As described above, part of the second copper structure 31c diffuses into the iron structure 33, and hence high neck strength can be obtained between the second copper structure 31c and the iron structure 33. It should be noted that, in FIG. 9, the ferrite phase (αFe), the pearlite phase (γFe), and the like are represented by shading. Specifically, the ferrite phase (αFe), the bronze phase 16, the alloy phase 17 (Fe—Cu—Sn alloy), and the pearlite phase (γFe) are shaded with increasing darkness in the stated order.

Figure 10A:
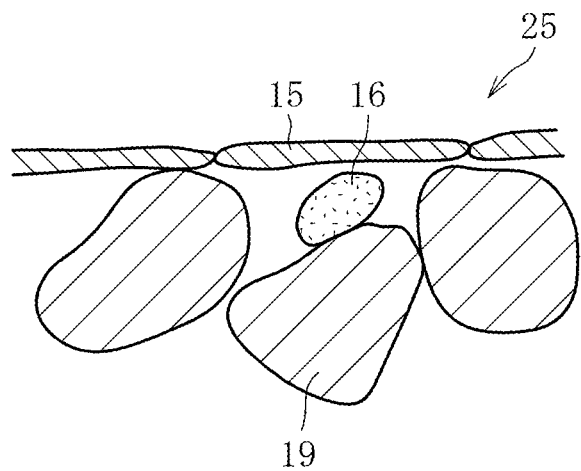
FIG. 10a is an enlarged view for describing spheroidization of the flat copper powder and illustrating a state before sintering.
Figure 10B:
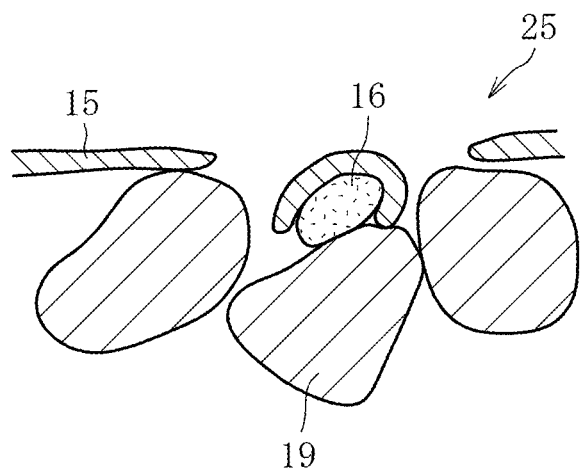
FIG. 10b is an enlarged view for describing the spheroidization of the flat copper powder and illustrating a state after the sintering.

When general iron powder 19 is used instead of the partially diffusion-alloyed powder 11, as illustrated in FIG. 10(a), part of the low-melting point metal powder 16 is present between the flat copper powder 15 and the general iron powder 19. When sintering is performed under such state, there arises a so-called spheroidization problem of the flat copper powder 15, in which the flat copper powder 15 is drawn by the low-melting point metal powder 16 through surface tension of the molten low-melting point metal powder 16 and rounded around the low-melting point metal powder 16 as a core. When the flat copper powder 15 is left spheroidized, the area of the copper structure 31a in the surface layer S1 is reduced (see FIG. 9), resulting in a large influence on the sliding characteristics of the bearing surface 1a.

Figure 11:
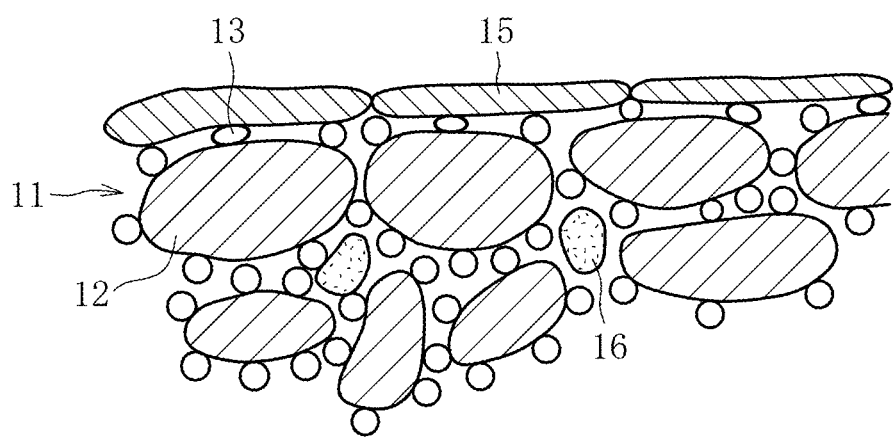
FIG. 11 is an enlarged view for conceptually illustrating the structures of a green compact of the present invention before the sintering.

In contrast, in the present invention, as illustrated in FIG. 11, the partially diffusion-alloyed powder 11 in which almost the entire periphery of the iron powder 12 is covered with the copper powder 13 is used as the raw material powder, and hence a number of grains of the copper powder 13 are present around the low-melting point metal powder 16. In this case, the low-melting point metal powder 16 melting along with sintering diffuses into the copper powder 13 of the partially diffusion-alloyed powder 11 ahead of the flat copper powder 15. In particular, in an initial stage of sintering, this phenomenon is promoted because of the fluid lubricant remaining on the surface of the flat copper powder 15. With this, an influence of the low-melting point metal powder 16 on the flat copper powder 15 of the surface layer S1 can be suppressed (even when the low-melting point metal powder 16 is present just below the flat copper powder 15, surface tension acting on the flat copper powder 15 is reduced). Accordingly, the spheroidization of the flat copper powder 15 in the surface layer can be suppressed, the ratio of the copper structure in the surface of the bearing including the bearing surface 1a is increased, and good sliding characteristics can be obtained. In order to exploit the above-mentioned feature, it is preferred to add the least amount possible of elemental iron powder to the raw material powders. That is, it is preferred that the iron structure 33 be entirely derived from the partially diffusion-alloyed powder.

As described above, in the present invention, the spheroidization of the flat copper powder 15 in the surface layer S1 can be avoided, and hence the blending ratio of the low-melting point metal powder 16 can be increased in the bearing. That is, while it is existing common general technical knowledge that the blending ratio (weight ratio) of the low-melting point metal needs to be suppressed to less than 10 wt % with respect to the flat copper powder 15 in order to suppress the spheroidization influence on the flat copper powder 15, the ratio can be increased to from 10 wt % to 30 wt % according to the present invention. Such increase in blending ratio of the low-melting point metal leads to a further increase in effect of promoting bonding between metal grains through liquid phase sintering, and hence is more effective for an increase in strength of the sintered bearing 1.

With the above-mentioned configuration, in the entire surface of the surface layer S1 including the bearing surface 1a, the area ratio of the copper structure to the iron structure can be 60% or more, and the copper-rich bearing surface 1a less susceptible to oxidation can be stably obtained. In addition, even when the surface layer S1 is worn, the copper structure 31c derived from the copper powder 13 adhering onto the partially diffusion-alloyed powder 11 is exposed on the bearing surface 1a. Therefore, even when the sintered bearing 1 is used for the starter ST, the fretting wear of the bearing surface 1a can be prevented. In addition, the sliding characteristics of the bearing surface 1a including an initial running-in property and quietness can also be improved.

On the other hand, the base part S2 located inside the surface layer S1 is a hard structure having a small content of copper and a large content of iron as compared to the surface phase S1. Specifically, the base part S2 has the largest content of Fe, and a content of Cu of from 20 wt % to 40 wt %. As described above, the base part S2 occupying most of the bearing 1 has a large content of iron, and hence the usage amount of copper in the entire bearing 1 can be reduced, with the result that low cost can be achieved. In addition, the strength of the entire bearing can be increased by virtue of the large content of iron.

In particular, in the present invention, the metal having a lower melting point than copper is blended in a predetermined amount, and a bonding force between metal grains (between the respective iron grains, between the iron grains and the copper grains, or between the respective copper grains) is increased through liquid phase sintering, and further, high neck strength is obtained between the copper structure 31c and the iron structure 33 derived from the partially diffusion-alloyed powder 11. With this, the copper structure and the iron structure are prevented from escaping from the bearing surface 1a, and the wear resistance of the bearing surface can be improved. In addition, the strength of the bearing can be increased. Specifically, radial crushing strength (300 MPa or more) twice or more as high as that of an existing copper-iron-based sintered compact can be achieved. Therefore, as illustrated in FIG. 2, even when the sintered bearing 1 is press-fitted and fixed to the inner periphery of the housing 3, the bearing surface 1a does not deform in accordance with the shape of the inner peripheral surface of the housing 3, and the circularity, cylindricity, and the like of the bearing surface 1a can be stably maintained after mounting. Accordingly, after the sintered bearing 1 is press-fitted and fixed to the inner periphery of the housing 3, a desired circularity (for example, a circularity of 3 μm or less) can be secured without additional processing for finishing the bearing surface 1a into an appropriate shape with appropriate accuracy (for example, sizing). In addition, even when the shaft 2 is brought into contact with the bearing surface 1a through vibration of an engine, the deformation of the bearing surface 1a can be prevented.

Besides, free graphite is precipitated on the entire surface including the bearing surface 1a, and further flake graphite is caused to adhere onto the molding surface 20a in the form in which the flake graphite accompanies the flat copper powder 3. Therefore, the content ratio of graphite in the surface layer S1 is higher than that in the base part S2. As a result, the friction of the bearing surface 1a can be reduced, and the durability of the bearing 1 can be increased.

In the first embodiment described above, the iron structure is formed of the two-phase structure including a ferrite phase and a pearlite phase. However, there is a risk in that the pearlite phase (γFe), which has a hard structure (HV 300 or more) and hence has high aggressiveness to a mating member, allows progression of the wear of the shaft 2 depending on the use conditions of the bearing. In order to eliminate such risk, the entire iron structure 33 may be formed of the ferrite phase (αFe).

In order to form the entire iron structure 33 of the ferrite phase as described above, a sintering atmosphere is set to a gas atmosphere not containing carbon (hydrogen gas, nitrogen gas, argon gas, or the like) or a vacuum atmosphere. With such measure, a reaction between carbon and iron does not occur in the raw material powders. Accordingly, the iron structure after sintering is entirely formed of the soft ferrite phase (αFe) (HV 200 or less). With such configuration, even when the surface layer S1 is worn and the iron structure 33 of the base part S2 is exposed on the surface, the bearing surface 1a can be softened, and the aggressiveness to the shaft 2 can be reduced. Other configurations, such as the composition of the raw material powders and manufacturing procedures, are common with those in the first embodiment, and overlapping description is omitted.

Figure 12:
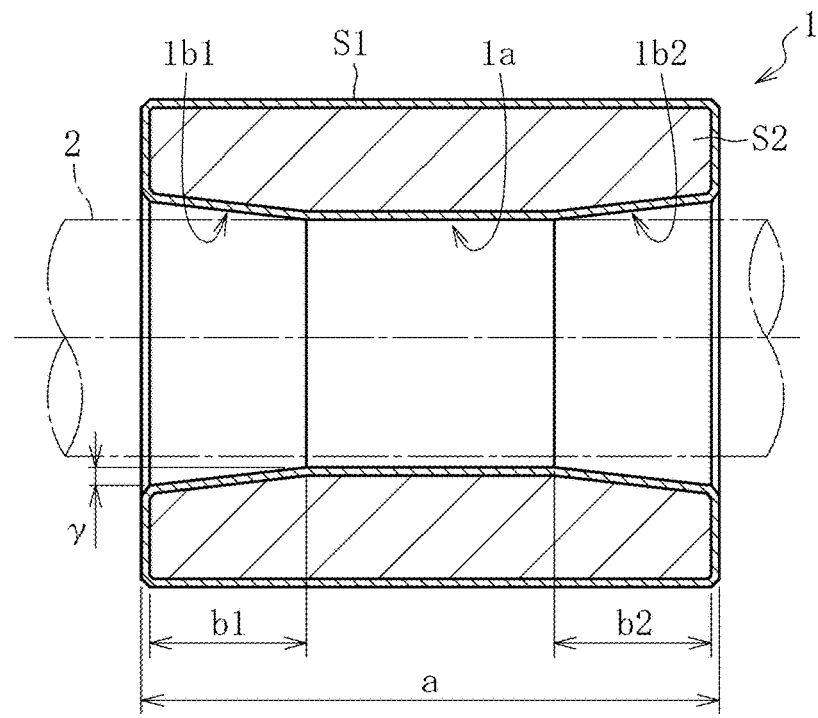
FIG. 12 is a sectional view for illustrating a sintered bearing according to another embodiment of the present invention.

As illustrated in FIG. 12, the bearing surface 1a, which is a cylindrical surface, of the sintered bearing 1 comprising the surface layer S1 and the base part S2 may have formed therein tapered surfaces 1b1 and 1b2 in both sides thereof in a shaft direction, the tapered surfaces 1b1 and 1b2 each providing a larger diameter on an opening side. When the tapered surfaces 1b1 and 1b2 are formed in both sides of the sintered bearing 1 in the shaft direction, the outer peripheral surface of the shaft 2 is prevented from being brought into local abutment with an end portion of the sintered bearing 1 even when the shaft 2 is deflected, and local wear of the bearing surface 1a, a reduction in strength of the bearing, and generation of extraordinary noise due to stress concentration can be prevented.

In order to obtain the above-mentioned effects, it is preferred to set the ratio X (X=γ/b1 or X=γ/b2) of the maximum value γ of a drop amount in a radius direction to each of the lengths b1 and b2 of the tapered surfaces 1b1 and 1b2 in the shaft direction (each length excludes a chamfer in the end portion in the shaft direction) to fall within a range of $1.75 \times 10^{-3} \leq X \leq 5.2 \times 10^{-2}$ (a range of a taper angle of the tapered surface of from 0.1° to 3°). It should be noted that, in this case, it is preferred to set the ratio of the sum of the lengths of the tapered surfaces 1b1 and 1b2 in the shaft direction to the entire length a of the sintered bearing 1 in the shaft direction to fall within a range of $0.2 \leq (b1+b2)/a \leq 0.8$. The sintered bearing 1 illustrated in FIG. 12 may be used for, for example, a drive mechanism for an automobile power window or a drive mechanism for an automobile power seat.

Figure 13:
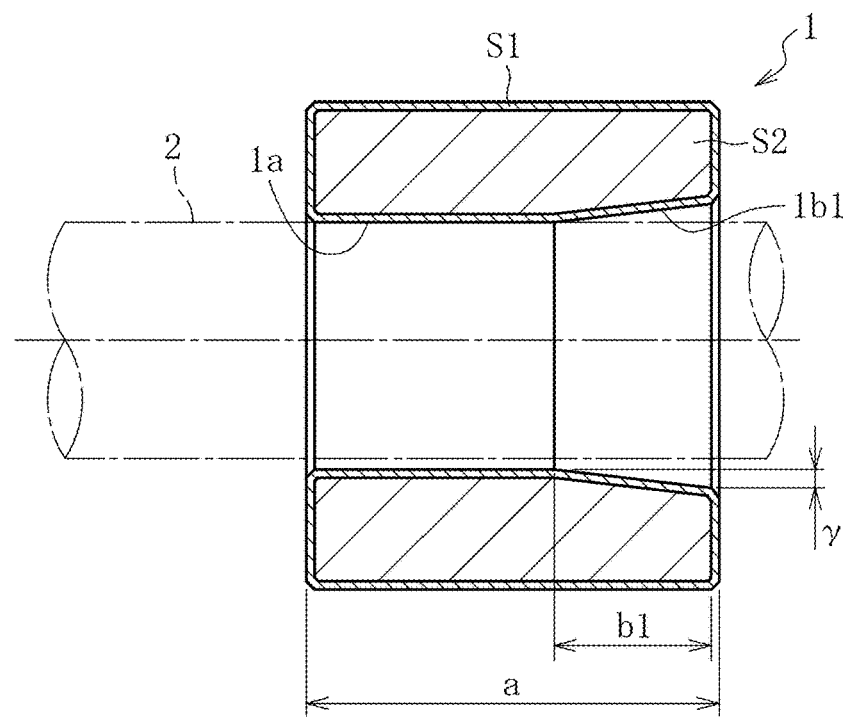
FIG. 13 is a sectional view for illustrating a sintered bearing according to still another embodiment of the present invention.

As illustrated in FIG. 13, the bearing surface 1a, which is a cylindrical surface, of the sintered bearing 1 may have formed therein the tapered surface 1b1 in only one side thereof in the shaft direction, the tapered surface 1b1 providing a larger diameter on the opening side. With such configuration, the actions and effects similar to those in the embodiment illustrated in FIG. 12 can be obtained. As in the embodiment illustrated in FIG. 12, it is preferred to set the ratio X (X=γ/b1) of the maximum value γ of a drop amount in a radius direction to the tapered surface 1b1 to fall within a range of $1.75 \times 10^{-3} \leq X \leq 5.2 \times 10^{-2}$ (a range of a taper angle of the tapered surface of from 0.1° to 3°). It should be noted that, in this case, it is preferred to set the ratio of the length of the tapered surface 1b1 in the shaft direction to the entire length a of the sintered bearing 1 in the shaft direction to fall within a range of $0.2 \leq b/a \leq 0.8$. The sintered bearing 1 illustrated in FIG. 13 may be used for, for example, a drive mechanism for an automobile power window or a drive mechanism for an automobile power seat.

Figure 14:
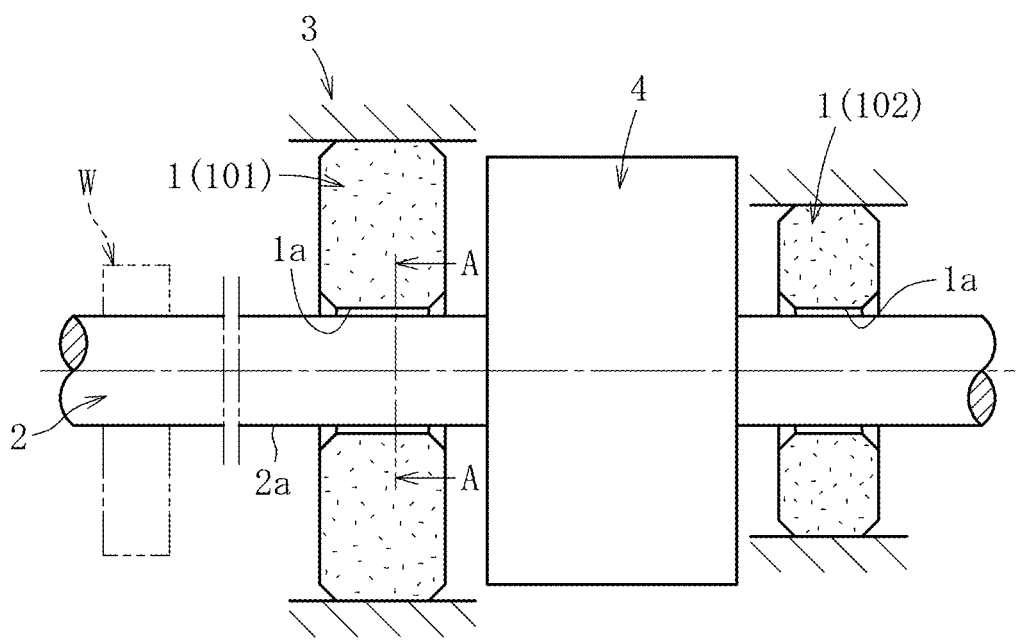
FIG. 14 is a schematic sectional view of a main portion of a vibration motor.

The sintered bearing 1 illustrated in FIG. 1 can be used for a vibration motor which functions as a vibrator configured to notify the user of an incoming call, mail reception, or the like in a mobile terminal etc. including a mobile phone and a smartphone. As illustrated in FIG. 14, the vibration motor has a configuration in which a housing 3 of the vibration motor, and by extension the entirety of a mobile terminal is vibrated through rotation of a weight (eccentric weight) W mounted to one end of the shaft 2 by the motor part 4. Conceptually illustrated in FIG. 14 is a main portion of the vibration motor using two sintered bearings 1 (101, 102). In the illustrated example, both sides of the shaft 2 protruding from the motor part 4 on both sides thereof in a shaft direction are supported by the sintered bearings 1 (101, 102) in a rotatable manner. The sintered bearing 101 on a weight W side is arranged between the weight W and the motor part 4, and is formed into a large thickness and a large diameter as compared to the sintered bearing 102 on the opposite side to the weight W. The two sintered bearings 1 each have the bearing surface 1a on its inner periphery, and are each fixed to the inner periphery of the housing 3 formed of, for example, a metal material by means of press-fitting or the like.

Figure 15:
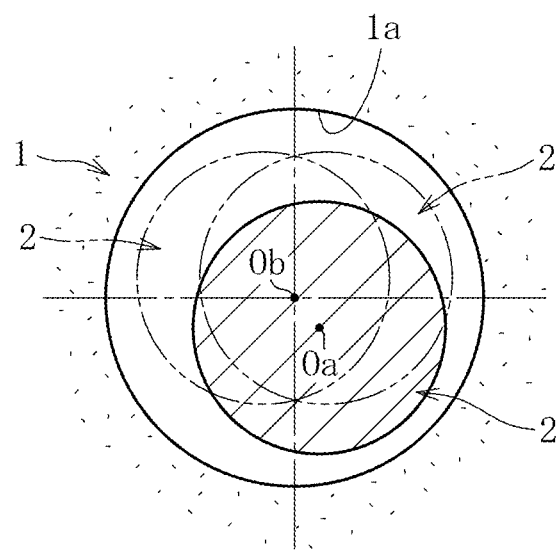
FIG. 15 is a sectional view taken along the line A-A of FIG. 14.

In the vibration motor, the shaft 2 is driven at a rotation number of 10,000 rpm or more. When the shaft 2 rotates, the shaft 2 rotates while oscillating along the entire surface of the bearing surface 1a under the influence of the weight W. In a general-use sintered bearing, the shaft 2 is configured to rotate while keeping an eccentric state in a direction of the gravitational force. However, in the sintered bearing 1 for a vibration motor, as illustrated in FIG. 15, the shaft 2 is configured to rotate under the state in which the center Oa of the shaft is eccentric with respect to to the center Ob of the bearing not only in the direction of the gravitational force but also in all directions.

As described above, in the bearing for a vibration motor, the shaft 2 is configured to oscillate along the entire surface of the bearing surface, and further, the bearing surface is frequently beaten by the shaft owing to an unbalanced load (the shaft is frequently brought into slide contact with the bearing surface). Therefore, the bearing surface is liable to be worn as compared to that in the general-use sintered bearing. In addition, when the bearing surface even slightly deforms in accordance with the inner periphery of the housing through press-fitting of the sintered bearing to the inner periphery of the housing 3, the rotation accuracy of the shaft 2 is largely affected. Those problems can be solved by using the sintered bearing 1 of the present invention for the vibration motor.

It should be noted that, in the sintered bearing 1 for a vibration motor, powder having an average grain size of 145 mesh or less (an average grain diameter of 106 μm or less) is preferably used as the partially diffusion-alloyed powder. With this, the porous structure of the bearing is homogenized, and the generation of coarse pores can be prevented. As a result, the bearing 1 is densified, and radial crushing strength and wear resistance with which the bearing can withstand the use as a bearing for a vibration motor can be obtained. In order to prevent a reduction in powder filling property in the compacting step, the ratio of the partially diffusion-alloyed powder having an average grain size of 350 mesh (an average grain diameter of 45 μm) or less is preferably set to less than 25 mass %. In addition, for example, the sintered bearing 1 illustrated in any one of FIG. 12 and FIG. 13 may be used as the sintered bearing 1 for a vibration motor. In this case, in each figure, the ratio X of the maximum value γ of the drop amount in the radius direction to the length of the tapered surface in the shaft direction may be set to fall within a range similar to the above-mentioned range.

The case of entirely forming the iron structure and the copper structure of the sintered bearing 1 only of the partially diffusion-alloyed powder has been described, but any one or both of elemental iron powder and elemental copper powder may be added to the raw material powders to form part of the iron structure and the copper structure in the base part S2 of the elemental iron powder or the elemental copper powder. In this case, in order to secure minimum wear resistance, strength, and sliding characteristics, the ratio of the partially diffusion-alloyed powder is preferably set to 50 mass % or more in the raw material powders. The raw material powders in this case have blended therein 8 wt % to 20 wt % of the flat copper powder, 0.8 wt % to 6.0 wt % of the low-melting point metal powder (for example, tin powder), and 0.5 wt % to 2.0 wt % of the solid lubricant powder (for example, graphite powder), with the balance being the elemental iron powder or the elemental copper powder (or both the elemental powders).

With such configuration, the characteristics of the bearing can be adjusted by changing the blending amount of the elemental iron powder or the elemental copper powder while the wear resistance, high strength, and good sliding characteristics to be obtained through use of the partially diffusion-alloyed powder are maintained. For example, when the elemental iron powder is added, the wear resistance and strength of the bearing can be increased while low cost is realized through a reduction in usage amount of the partially diffusion-alloyed powder. When the elemental copper powder is added, the sliding characteristics can be further improved. Therefore, such configuration enables a reduction in development cost of sintered bearings suitable for various applications, and can meet the manufacturing of a wide variety of sintered bearing products in small quantities.

Second Embodiment

While the copper structure in the bearing surface 1a is formed of the flat copper powder in the sintered bearing 1 of the first embodiment described above, the copper structure in the bearing surface 1a may be formed of the copper powder in the partially diffusion-alloyed powder. The details of such sintered bearing 1 is described below as a second embodiment taking as an example a case of using the sintered bearing 1 for the vibration motor (FIG. 14).

Raw material powders in the second embodiment are mixed powders having blended therein the partially diffusion-alloyed powder, the low-melting point metal powder, the solid lubricant powder, and additional powder formed of any one or both of the elemental iron powder and the elemental copper powder. The mass ratio of the partially diffusion-alloyed powder is the highest among the mass ratios of the powders in the raw material powders. Various molding lubricants (for example, a lubricant for improving mold releasability) may be added to the raw material powders as necessary.

As described above, as the partially diffusion-alloyed powder 11 (see FIG. 3), powder having an average grain size of 145 mesh or less (an average grain diameter of 106 μm or less) and having a ratio of grains having an average grain size of 350 mesh or less (average grain diameter of 45 μm or less) of less than 25 mass % is preferably used.

As the iron powder 12 constituting the partially diffusion-alloyed powder 11, reduced iron powder, atomized iron powder, or other known iron powders may be used. In this embodiment, the reduced iron powder is used. The iron powder 12 to be used has an average grain diameter of preferably from 20 μm to 106 μm, more preferably from 38 μm to 75 μm.

In addition, as the copper powder 13 constituting the partially diffusion-alloyed powder 11, generally-used irregular or dendritic copper powder may be used widely. For example, electrolytic copper powder, atomized copper powder, or the like is used. In this embodiment, the atomized copper powder, which has a number of irregularities on its surface, has a substantially spherical but irregular shape in the entirety of its grain, and is excellent in formability, is used. The copper powder 13 to be used has a grain diameter smaller than that of the iron powder 12, specifically has an average grain diameter of 5 μm or more and 20 μm or less (preferably less than 20 μm). It should be noted that the ratio of Cu is from 10 mass % to 30 mass % (preferably from 22 mass % to 26 mass %) in the partially diffusion-alloyed powder 11.

As the low-melting point metal powder, metal powder having a melting point of 700° C. or less, such as tin powder, zinc powder, or phosphorus powder, is used. In this embodiment, of those powders, tin powder, which easily diffuses into copper and iron and may be used as elemental powder, in particular atomized tin powder, is used. The tin powder (atomized tin powder) to be used has an average grain diameter of preferably from 5 μm to 63 μm, more preferably from 20 μm to 45 μm.

As the solid lubricant, one kind or two or more kinds of graphite powder, molybdenum disulfide powder, and the like may be used. In this embodiment, graphite powder, in particular, flake graphite powder is used in consideration of cost.

The additional powder is formed of any one or both of the elemental iron powder and the elemental copper powder. As the elemental iron powder, both of reduced iron powder and atomized iron powder may be used. The iron powder to be used is selected depending on the applications of the bearing. It should be noted that a mixture of the reduced iron powder and the atomized iron powder may be used as the elemental iron powder. In addition, as the elemental copper powder, both of electrolytic copper powder and atomized copper powder may be used. The copper powder to be used is selected depending on the applications of the bearing. It should be noted that a mixture of the electrolytic copper powder and the atomized copper powder may be used as the elemental copper powder. The average grain diameters of the elemental iron powder and the elemental copper powder may be widely selected depending on the applications of the bearing. For example, powder having an average grain diameter falling within a range of from 45 μm to 200 μm (preferably from 100 μm to 150 μm) may be used as the elemental iron powder, and powder having an average grain diameter falling within a range of from 45 μm to 150 μm (preferably from 80 μm to 125 μm) may be used as the elemental copper powder.

Figure 17:
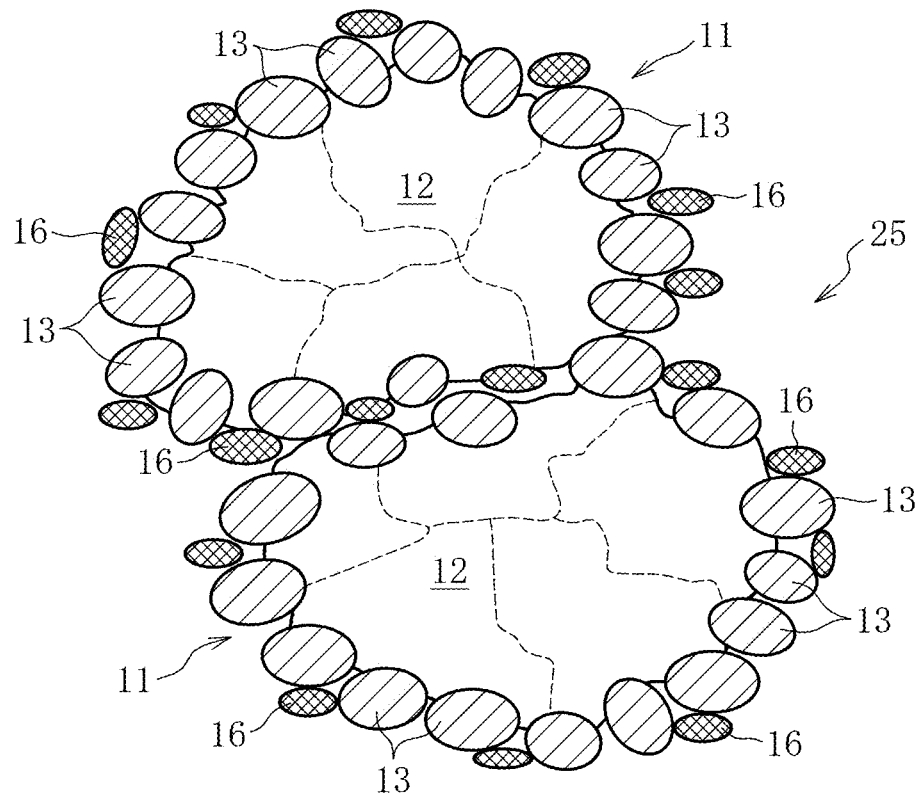
FIG. 17 is a view for conceptually illustrating part of the green compact.

Then, the raw material powders are compression molded with, for example, a mold set on a die set of a cam-type molding press machine, to forma green compact. As schematically illustrated in FIG. 17, the partially diffusion-alloyed powder 11, tin powder 16, and the graphite powder and the additional powder (not shown) are dispersed in the green compact 25. The partially diffusion-alloyed powder 11 used in this embodiment using the reduced iron powder as the iron powder 12 is soft and excellent in compression moldability as compared to the partially diffusion-alloyed powder using the atomized iron powder. As a result, the green compact 25 can be increased in strength even when having a low density, and the generation of chipping or breakage in the green compact 25 can be prevented.

Next, the green compact 25 is sintered, to obtain a sintered compact. The sintering conditions are set to conditions under which graphite (graphite powder) does not react with iron (diffusion of carbon does not occur). In an iron-carbon equilibrium state, there is a transformation point at 723° C., and iron and carbon start to react with each other when the temperature exceeds the transformation point, to thereby generate the pearlite phase (γFe) in the iron structure. However, in sintering, the reaction between carbon (graphite) and iron starts when the temperature exceeds 900° C., to thereby generate the pearlite phase (γFe). The pearlite phase (γFe) has a high hardness (HV 300 or more) and thus has high aggressiveness to a mating member. Therefore, when the pearlite phase (γFe) is excessively present in the iron structure of the sintered bearing 1, there is a risk in that the wear of the shaft 2 is progressed. In addition, in general manufacturing steps for the sintered bearing, the green compact is often heated and sintered under an atmosphere of an endothermic gas (RX gas) obtained through thermal decomposition of a mixture of a liquefied petroleum gas, such as butane and propane, and air with a Ni catalyst. However, when the endothermic gas is used, carbon may diffuse to harden the surface of the green compact, and a similar problem to that described above is liable to occur.

From the above-mentioned viewpoints, the green compact 25 is heated at 900° C. or less, specifically at 800° C. (preferably 820° C.) or more and 880° C. or less (low temperature sintering). In addition, the sintering atmosphere is set to a gas atmosphere not containing carbon (hydrogen gas, nitrogen gas, argon gas, or the like), or to a vacuum atmosphere. Under such sintering conditions, carbon and iron do not react with each other in the raw material powders, and hence the entire iron structure obtained after the sintering is formed of the soft ferrite phase (HV 200 or less). When the raw material powders contain various molding lubricants, such as the fluid lubricant, such molding lubricants are vaporized along with the sintering.

The iron structure may be entirely formed of the ferrite phase (αFe), or as illustrated in FIG. 9, may be formed of the two-phase structure containing a ferrite phase αFe and a pearlite phase γFe. With this, the pearlite phase γFe, which is harder than the ferrite phase αFe, contributes to improvement in wear resistance of the bearing surface, and the wear of the bearing surface is suppressed under high surface pressure. As a result, the life of the bearing can be prolonged. It should be noted that, when the presence ratio of the pearlite phase γFe becomes excessively high to reach a ratio comparable to that of the ferrite phase αFe, the aggressiveness to the shaft 2 due to pearlite is increased, and hence the shaft 2 is liable to be worn. In order to prevent this phenomenon, as illustrated in FIG. 7, the amount of the pearlite phase γFe is suppressed to the extent that the pearlite phase γFe is present (in a scattered manner) at a grain boundary of the ferrite phase αFe. The "grain boundary" herein refers to not only a grain boundary formed between powder grains but also a crystal grain boundary formed in the powder grains. When the iron structure is formed of the two-phase structure containing a ferrite phase αFe and a pearlite phase γFe, the ratios of the ferrite phase αFe and the pearlite phase γFe in the iron structure are desirably from about 80% to about 95% and from about 5% to about 20%, respectively (αFe:γFe=80%-95%:5%-20%), in terms of an area ratio in an arbitrary cross section of the sintered compact. With this, a balance between suppression of the wear of the shaft 2 and improvement in wear resistance of the bearing surface 1*a* can be achieved.

The precipitation amount of the pearlite phase γFe mainly depends on the sintering temperature and the atmosphere gas. Thus, it order that the pearlite phase γFe may be present at the grain boundary of the ferrite phase αFe in the above-mentioned manner, the sintering is carried out under the conditions that the sintering temperature is increased to from about 820° C. to about 900° C., and a gas containing carbon, such as a natural gas or an endothermic gas (RX gas), is used as the furnace atmosphere. Accordingly, carbon contained in the gas diffuses into iron at the time of sintering, with the result that the pearlite phase γFe can be formed. It should be noted that, as described above, when the green compact 25 is sintered at a temperature exceeding 900° C., carbon in the graphite powder and iron react with each other to form the pearlite phase γFe. Therefore, it is preferred to sinter the green compact 25 at 900° C. or less.

After the sintering, the sintered compact is subjected to sizing to be finished into a finish shape and size, and then a lubricating oil is impregnated into the inner pores of the sintered compact by a method such as vacuum pressure impregnation, to complete the sintered bearing 1 illustrated in FIG. 14. As the lubricating oil to be impregnated into the inner pores of the sintered compact, a low-viscosity oil, specifically an oil having a kinematic viscosity of from 10 mm$^2$/s to 50 mm$^2$/s at 40° C. (for example, a synthetic hydrocarbon-based lubricating oil) is used. This is because the rigidity of an oil film formed in a bearing clearance is secured and an increase in rotation torque is suppressed. It should be noted that grease containing as a base oil the lubricating oil having a kinematic viscosity of from 10 mm$^2$/s to 50 mm$^2$/s at 40° C. may be impregnated into the inner pores of the sintered compact. In addition, it is appropriate to perform the sizing as necessary, and the sizing is not necessarily performed. In addition, depending on applications, the step of impregnating a lubricating oil may be omitted so that the sintered bearing is used under an oil-less condition.

Under the above-mentioned sintering conditions in which the sintering temperature of the green compact 25 is set to 900° C. or less, which is much lower than the melting point of copper (1,083° C.), the copper powder 13 constituting the partially diffusion-alloyed powder 11 in the green compact 25 does not melt, and thus copper does not diffuse into iron (iron structure) along with the sintering. As a result, an appropriate amount of a copper structure is formed on the surface of the sintered compact (bearing surface 1*a*). In addition, free graphite is exposed on the surface of the sintered compact. Inconsequence, the sintered bearing 1 having a good initial running-in property with respect to the shaft 2 and having a low friction coefficient on the bearing surface 1*a* can be obtained.

An iron structure containing as a main component iron and a copper structure containing as a main component copper are formed in the sintered compact. The iron structure and the copper structure in the sintered compact, which are mostly formed of the partially diffusion-alloyed powder 11, can achieve high neck strength therebetween after the sintering because, in the partially diffusion-alloyed powder, part of the copper powder is diffused into the iron powder. In addition, at the time of sintering, the tin powder 16 in the green compact 25 melts to wet the surface of the copper powder 13 constituting the partially diffusion-alloyed powder 11. Along with this, liquid phase sintering is progressed between tin (Sn) and copper (Cu), to thereby form a bronze phase (Cu—Sn) 16 for bonding the iron structure and the copper structure or the respective copper structures of the partially diffusion-alloyed powder 11 adjacent to each other as illustrated in FIG. 9. In addition, in the individual partially diffusion-alloyed powder 11, molten Sn diffuses into a portion in which part of the copper powder 13 diffuses on the surface of the iron powder 12 to form an Fe—Cu alloy, and thus forms an Fe—Cu—Sn alloy (alloy phase) 17. As a result, the neck strength between the iron structure and the copper structure is further increased. Accordingly, high radial crushing strength, specifically radial crushing strength of 300 MPa or more can be obtained even through low temperature sintering as described above. In addition, the bearing surface 1*a* is hardened, and the wear resistance of the bearing surface 1*a* can also be improved.

In addition, in the second embodiment, the raw material powders have blended therein the additional powder formed of the elemental iron powder and the elemental copper powder. Accordingly, the characteristics of the bearing can be adjusted by changing the blending amount of the elemental iron powder or the elemental copper powder while the wear resistance, high strength, and good sliding characteristics to be obtained through use of the partially diffusion-alloyed powder are maintained. For example, when the elemental iron powder is used as the additional powder, the wear resistance and strength of the bearing can be further increased. When the elemental copper powder is used as the additional powder, the sliding characteristics can be further improved. Therefore, the present invention enables a reduction in development cost of sintered bearings suitable for various applications, and can meet the manufacturing of a wide variety of sintered bearing products in small quantities. For example, the limit of the diffusion amount of the copper powder into the partially diffusion-alloyed powder is about 30 mass %. Therefore, it is difficult to further increase the ratio of copper in the bearing when the copper structure is formed only of the partially diffusion-alloyed powder. In contrast, when the elemental copper powder is blended as the additional powder, the ratio of copper in the bearing can be increased to more than 30 mass %.

When the blending ratio of the partially diffusion-alloyed powder is excessively low in the raw material powders, merits provided by the use of the partially diffusion-alloyed powder are diminished, and it becomes difficult to satisfy the wear resistance, strength, and sliding characteristics. Accordingly, the blending ratio of the partially diffusion-alloyed powder in the raw material powders is preferably set to 50 mass % or more (desirably 75 mass % or more). In addition, when the blending ratio of the solid lubricant powder is excessively low, the sliding characteristics are impaired, and when the blending ratio of the solid lubricant powder is excessively high, a reduction in radial crushing strength occurs. Therefore, the blending ratio of the solid lubricant powder in the raw material powders is set to from 0.3 mass % to 1.5 mass %. When the blending ratio of the low-melting point metal powder is excessively low, the liquid phase sintering is progressed insufficiently, resulting in a reduction in strength, and when the blending ratio of the low-melting point metal powder is excessively high, there arises a problem in that coarse pores increase, while the mechanical strength of the sintered compact increases. Therefore, the blending ratio of the low-melting point metal powder is preferably set to about 10 mass % with respect to the total mass of the copper powders in the raw material powders (sum of the copper powder in the partially diffusion-alloyed powder and the elemental copper powder added as the additional powder). Specifically, the blending ratio of the low-melting point metal in the raw material powders is set to from 0.5 mass % to 5.0 mass %. The balance of the raw material powders is formed of the additional powder and inevitable impurities. The blending ratio of the additional powder in the raw material powders is preferably set to at least 1.0 mass % or more in consideration of merits provided by its blending.

It should be noted that, in order to satisfy the sliding characteristics required for the bearing surface 1a, the ratio of copper in the sintered bearing 1 is set to at least 10 mass % or more (preferably 15 mass % or more).

In addition, when powder having an average grain size of 145 mesh or less (an average grain diameter of 106 μm or less) is used as the partially diffusion-alloyed powder 11, the porous structure of the sintered compact is homogenized, and the generation of coarse pores can be prevented. As a result, the sintered compact is densified, and radial crushing strength and the wear resistance of the bearing surface 1a can be further improved.

As described above, the sintered compact of this embodiment has radial crushing strength of 300 MPa or more, which is a value twice or more as high as that of an existing copper-iron-based sintered compact. In addition, the sintered compact of this embodiment has a density of 6.8±0.3 g/cm$^3$, which is higher than that of the existing iron-copper-based sintered compact (about 6.6 g/cm$^3$). Even the existing iron-copper-based sintered compact can be densified by highly compressing the green compact in its molding step, but through such operation, the fluid lubricant contained inside cannot burn and gasifies at the time of sintering, resulting in coarse pores in a surface layer part. In the present invention, there is no need to highly compress the green compact at the time of its molding, and such inconvenience can be prevented.

While the sintered compact is densified as described above, the content ratio of an oil may be increased to 15 vol % or more. A content ratio of an oil comparable to that in the existing iron-copper-based sintered bearing can be secured. This is mainly derived from the fact that the reduced iron powder, which has a sponge-like shape and is excellent in oil retention property, is used as the iron powder 12 constituting the partially diffusion-alloyed powder 11. In this case, the lubricating oil impregnated into the sintered compact is retained not only in pores formed between grains of sintered structures but also in pores in the reduced iron powder (including the reduced iron powder constituting the partially diffusion-alloyed powder, and in the case of using the reduced iron powder as the additional powder, the reduced iron powder as well).

Coarse pores are liable to be generated particularly in a surface layer part of the sintered compact (a region from the surface of the sintered compact to a depth of 100 μm). However, in the sintered compact obtained as described above, the generation of the coarse pores in the surface layer part can be suppressed as described above, and the surface layer part can be densified. Specifically, the ratio of pores in the surface layer part may be set to from 5% to 20%. The ratio of pores may be determined through, for example, image analysis for the area ratio of a porous part in an arbitrary cross section of the sintered compact.

Through such densification of the surface layer part, also the ratio of surface openings on the bearing surface 1a is reduced. Specifically, the ratio of surface openings on the bearing surface 1a may be set to fall within a range of 5% or more and 20% or less. It should be noted that, when the ratio of surface openings is less than 5%, it becomes difficult to allow a necessary and sufficient amount of the lubricating oil to seep out in the bearing clearance (an ability to form an oil film becomes insufficient), with the result that the merits as the sintered bearing cannot be obtained.

In addition, the partially diffusion-alloyed powder 11 in which the copper powder 13 is partially diffused on the surface of the iron powder 12 is used as the main raw material of the raw material powders for obtaining the sintered compact, and hence segregation of copper, which emerges as a problem in the existing iron-copper-based sintered bearing, can be prevented. In addition, the sintered compact can be increased in mechanical strength without using expensive metal powder, such as Ni or Mo, and hence also the sintered bearing 1 achieves a reduction in cost.

As described above, the sintered bearing 1 according to the second embodiment has high radial crushing strength (radial crushing strength of 300 MPa or more), and hence as illustrated in FIG. 14, even when the sintered bearing 1 is press-fitted and fixed to the inner periphery of the housing 3, the bearing surface 1a does not deform in accordance with the shape of the inner peripheral surface of the housing 3, and the circularity, cylindricity, and the like of the bearing surface 1a can be stably maintained after mounting. Accordingly, after the sintered bearing 1 is press-fitted and fixed to the inner periphery of the housing 3, a desired circularity (for example, a circularity of 3 μm or less) can be secured without additional processing for finishing the bearing surface 1a into an appropriate shape with appropriate accuracy (for example, sizing). In addition, when the sintered bearing 1 has radial crushing strength of 300 MPa or more, the deformation of the bearing surface 1a is prevented as much as possible even when a vibration motor having incorporated therein the sintered bearing 1 (and by extension a mobile terminal or the like comprising the vibration motor) is dropped or the like, and a large impact load is applied to the bearing surface 1a. Further, the bearing surface 1a is increased in hardness and has high wear resistance, and hence the wear or damage of the bearing surface 1a is suppressed even when the shaft 2 oscillates along the entire surface of the bearing surface 1a or frequently collides with the bearing surface 1a. Therefore, according to the present invention, the sintered bearing 1 suitable for supporting the vibration motor can be provided at low cost.

Figure 16:
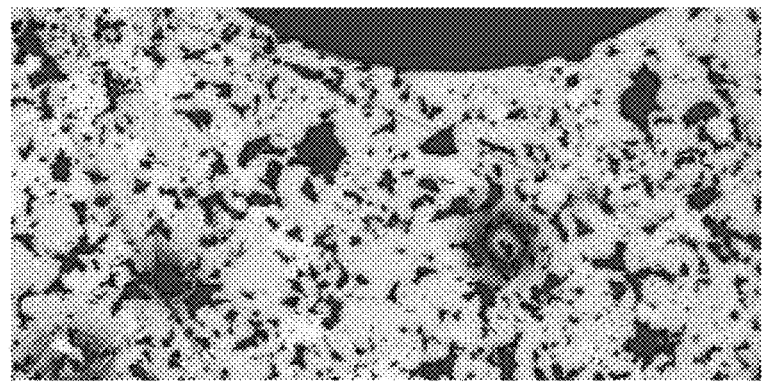
FIG. 16 is a micrograph of a cross section including a bearing surface.
Figure 18:
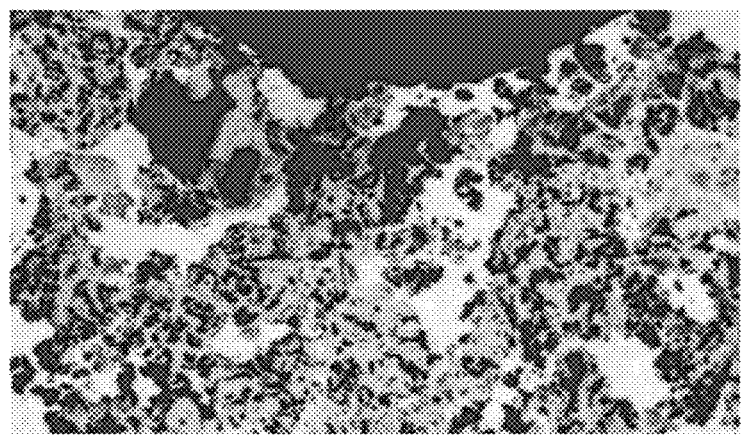
FIG. 18 is a micrograph of a cross section including a bearing surface of a sintered bearing according to the related art.

Now, as reference, a micrograph of a surface layer part of a sintered bearing according to technical means disclosed in Patent Literature 1 (hereinafter referred to as "copper-covered iron powder bearing") is shown in FIG. 18. When FIG. 18 and a micrograph of the surface layer part of the sintered bearing 1 according to the second embodiment (see FIG. 16) are compared, it is understood that the porous structure of the surface layer part of the sintered bearing 1 according to the second embodiment is homogeneous and dense as compared to that of the copper-covered iron powder bearing. In actuality, the ratio of pores in the surface layer part of the copper-covered iron powder bearing was about 25.5%, whereas the ratio of pores in the surface layer part of the sintered bearing 1 according to the second embodiment was 13.6%. A possible cause for such difference is insufficient neck strength between an iron phase and a copper phase in the copper-covered iron powder because a copper film is only brought into close contact with iron powder in the copper-covered iron powder.

The configurations and actions of the second embodiment described above are summarized below.

The sintered bearing has on its inner periphery a bearing surface for forming a bearing clearance with a shaft to be supported, and comprises a sintered compact obtained by forming the raw material powders containing the partially diffusion-alloyed powder in which the copper powder is partially diffused into the iron powder, the low-melting point metal powder, the solid lubricant powder, and the additional powder formed of any one or both of the elemental iron powder and the elemental copper powder, and then sintering the resultant.

Through use of the partially diffusion-alloyed powder, in which part of the copper powder is diffused into the iron powder, high neck strength is obtained between the iron structure and the copper structure after the sintering as compared to the case of using the copper-covered iron powder. In addition, the low-melting point metal powder in the green compact melts at the time of sintering after the molding (compression molding) of the raw material powders. The low-melting point metal has high wettability to copper, and hence the iron structure and the copper structure or the respective copper structures of the partially diffusion-alloyed powder adjacent to each other can be firmly bonded to each other through liquid phase sintering. Further, in the individual partially diffusion-alloyed powder, molten low-melting point metal diffuses into a portion in which part of the copper powder diffuses on the surface of the iron powder to form an Fe—Cu alloy. As a result, the neck strength between the iron structure and the copper structure can be further increased. Thus, the sintered bearing which is excellent in wear resistance of the bearing surface and has high strength can be obtained even through low temperature sintering. In addition, a large amount of the copper structure can be formed on the bearing surface by virtue of the partially diffusion-alloyed powder containing a considerable amount of the copper powder. As a result, good sliding characteristics (low torque property, initial running-in property, quietness, and the like) can be obtained.

Besides, the raw material powders have blended therein the additional powder formed of any one or both of the elemental iron powder and the elemental copper powder. Accordingly, the characteristics of the bearing can be adjusted depending on applications by changing the blending amount of the elemental iron powder or the elemental copper powder while high wear resistance, high strength, and good sliding characteristics are satisfied. For example, when the elemental iron powder is added, the wear resistance and the strength of the bearing can be further increased. When the elemental copper powder is added, the sliding characteristics can be improved. In order to secure minimum wear resistance, strength, and sliding characteristics, the ratio of the partially diffusion-alloyed powder is preferably set to 50 wt % or more in the raw material powders.

The sintered bearing preferably has radial crushing strength of 300 MPa or more. The use of the partially diffusion-alloyed powder as a main raw material facilitates the securement of such radial crushing strength.

In order to obtain the sintered bearing (sintered compact) described above, it is preferred to use, as the partially diffusion-alloyed powder to be contained in the raw material powders, partially diffusion-alloyed powder in which copper powder having an average grain diameter of 5 μm or more and less than 20 μm is partially diffused on the surface of the iron powder and which has a ratio of Cu of from 10 mass % to 30 mass %.

It was revealed that, when large-grain-diameter partially diffusion-alloyed powder having an average grain diameter exceeding 106 μm was contained in the raw material powders, coarse pores were liable to be formed in the inside of the sintered compact, with the result that the wear resistance of the bearing surface, the radial crushing strength, and the like to be required were not able to be secured in some cases. Accordingly, the partially diffusion-alloyed powder to be used preferably has an average grain size of 145 mesh or less (average grain diameter of 106 μm or less). Through use of such alloyed powder, a sintered compact which has a homogenized metal structure (porous structure) after the sintering and is suppressed in the generation of coarse pores in the metal structure can be stably obtained. As a result, a sintered bearing in which the wear resistance of the bearing surface and the radial crushing strength of the bearing are further improved can be stably obtained.

In the sintered bearing, tin powder may be used as the low-melting point metal powder, and graphite powder may be used as the solid lubricant powder.

When the iron structure of the sintered compact is formed mainly of the soft ferrite phase, the aggressiveness of the bearing surface to the shaft can be reduced, with the result that the wear of the shaft can be suppressed. The iron structure formed mainly of the ferrite phase may be obtained by, for example, sintering the green compact at a temperature of 900° C. or less, at which iron and graphite do not react with each other.

The iron structure formed mainly of the ferrite phase includes a structure formed entirely of the ferrite phase as well as such an iron structure that the pearlite phase, which is harder than the ferrite phase, is present at the grain boundary of the ferrite phase. When the pearlite phase is formed at the grain boundary of the ferrite phase as described above, the wear resistance of the bearing surface can be improved as compared to the case of forming the iron structure only of the ferrite phase. In order to achieve a balance between suppression of the wear of the shaft and improvement in wear resistance of the bearing surface, the ratios of the ferrite phase ($\alpha$Fe) and the pearlite phase ($\gamma$Fe) in the iron structure are preferably set to from 80% to 95% and from 5% to 20%, respectively ($\alpha$Fe:$\gamma$Fe=80%-95%:5%-20%). It should be noted that the ratios may be determined, for example, based on area ratios of the ferrite phase and the pearlite phase in an arbitrary cross section of the sintered compact.

The reduced iron powder may be used as the iron powder constituting the partially diffusion-alloyed powder (Fe—Cu partially diffusion-alloyed powder). Other than the reduced iron powder, the atomized iron powder or the like may be used as the iron powder. However, the reduced iron powder is soft and excellent in compression moldability as compared to the atomized iron powder by virtue of its sponge-like shape (porous shape) having inner pores. Therefore, the green compact can be increased in strength even when having a low density, and the chipping and breakage in the green compact can be prevented. In addition, the reduced iron powder, which has a sponge-like shape as described above, has an advantage of being excellent in oil retention property as compared to the atomized iron powder.

In the above-mentioned configuration, the ratio of pores in the surface layer part, in particular the ratio of pores in the surface layer part including the bearing surface is preferably set to from 5% to 20%. It should be noted that the "surface layer part" herein refers to a region from the surface to a depth of 100 μm.

The sintered compact (inner pores) may be impregnated with a lubricating oil. The lubricating oil to be used preferably has a kinematic viscosity falling within a range of from 10 mm$^2$/s to 50 mm$^2$/s at 40° C. This is because the rigidity of an oil film formed in a bearing clearance is secured and an increase in rotation torque is suppressed. It should be noted that, as the oil with which the sintered compact is impregnated, liquid grease containing as a base oil an oil (lubricating oil) having a kinematic viscosity falling within a range of from 10 mm$^2$/s to 50 mm$^2$/s at 40° C. may be adopted.

When the above-mentioned sintered bearing is used as a bearing configured to support a shaft of a vibration motor, the wear resistance of the bearing surface and the strength are improved, with the result that fluctuation in rotation can be prevented. In addition, the sintered compact has radial crushing strength of 300 MPa or more, and hence the deformation of the bearing surface at the time of press-fitting or owing to an impact load can be prevented as much as possible.

It should be noted that, in the above description, there is exemplified a case where the present invention is applied to a cylindrical bearing having the bearing surface 1a formed into a perfect circle shape. However, the present invention is not limited to the cylindrical bearing, and is similarly applicable to a fluid dynamic bearing having dynamic pressure generating portions, such as herringbone grooves and spiral grooves, formed in the bearing surface 1a or the outer peripheral surface of the shaft 2. In addition, the case where the shaft 2 is configured to rotate is described in this embodiment, but the present invention is applicable to an opposite application in which the bearing 1 is configured to rotate. Further, there are exemplified a starter for an automobile, a vibration motor to be used for a mobile terminal, and the like as applications, but the applications of the sintered bearing 1 according to the present invention are not limited to those applications. The sintered bearing 1 according to the present invention is applicable to a wide range of applications in addition to the exemplified ones.

In addition, at the time of compression molding of the green compact 25, there may be adopted a so-called warm molding method involving compression molding the green compact 25 under the state in which at least one of the mold 20 or the raw material powders are heated or a so-called molding method with mold lubrication involving compression molding the green compact 25 under the state in which a lubricant is applied onto a molding surface of the mold 20. The green compact 25 can be formed with higher accuracy by adopting such methods.

REFERENCE SIGNS LIST 1 bearing
1a bearing surface
2 shaft
3 housing
4 motor
11 partially diffusion-alloyed powder
12 iron powder
13 copper powder
14 graphite powder
15 flat copper powder
16 bronze phase
17 alloy phase
25 green compact
31a copper structure of surface layer
31b first copper structure of base part
31c second copper structure of base part
32 graphite (solid lubricant)
33 iron structure
S1 surface layer
S2 base part
ST starter
αFe ferrite phase
γFe pearlite phase
M motor part
W weight

The invention claimed is:

1. A manufacturing method of a sintered bearing, which contains as main components iron, copper, an element having a lower melting point than copper, and a solid lubricant, and comprises a base part containing an iron structure and a copper structure, and a surface layer containing a copper structure,
   the element having the lower melting point than copper being any of tin, zinc and phosphorus,
   the sintered bearing having a radial crushing strength of 300 MPa or more, and
   the surface layer covering a surface of the base part, wherein,
   the manufacturing method comprises the steps of:
      mixing partially diffusion-alloyed powder, flat copper powder having an aspect ratio of 13.3 to 160, powder of the element having the lower melting point than copper, and solid lubricant powder to form a mixed powder;
      forming a green compact with the mixed powder; and
      sintering the green compact at a temperature lower than a melting point of copper,
   wherein the partially diffusion-alloyed powder is obtained by partially diffusing a plurality of grains of copper powder on a surface of iron powder, a grain diameter of the copper powder of the partially diffusion-alloyed powder being smaller than that of the iron powder of the partially diffusion-alloyed powder,
   wherein an average grain diameter of the partially diffusion-alloyed powder is 106 μm or less, and
   wherein the copper structure of the surface layer is formed by sintering of the flat copper powder, and the iron structure and the copper structure of the base part are formed by sintering of the partially diffusion-alloyed powder.

2. The manufacturing method of the sintered bearing according to claim 1, wherein the copper structure of the surface layer is formed at a surface of the surface layer at an area ratio of 60% or more.

3. The manufacturing method of the sintered bearing according to claim 1, wherein the iron structure and the copper structure in the base part are entirely formed of the partially diffusion-alloyed powder.

4. The manufacturing method of the sintered bearing according to claim 1, wherein the iron structure and the copper structure in the base part are formed of: the partially diffusion-alloyed powder; and any one or both of elemental iron powder and elemental copper powder.

5. The manufacturing method of the sintered bearing according to claim 1, wherein, in the base part, the copper structure brought into contact with the iron structure comprises a structure in which the element having the lower melting point than copper is diffused in the copper powder.

6. The manufacturing method of the sintered bearing according to claim 1, wherein the sintered bearing contains the element having the lower melting point than copper at a weight ratio of 10 wt % or more and 30 wt % or less with respect to the flat copper powder.

7. The manufacturing method of the sintered bearing according to claim 1, wherein the solid lubricant comprises graphite.

8. The manufacturing method of the sintered bearing according to claim 1, wherein the iron structure in the base part is formed of a ferrite phase.

9. The manufacturing method of the sintered bearing according to claim 1, wherein the iron structure in the base part is formed of a ferrite phase and a pearlite phase that is present at a grain boundary of the ferrite phase.

10. The manufacturing method of the sintered bearing according to claim 1, wherein the partially diffusion-alloyed powder has a ratio of copper of 10 wt % or more and 30 wt % or less.

11. The manufacturing method of the sintered bearing according to claim 1, wherein the sintered bearing is impregnated with a lubricating oil having a kinematic viscosity of 30 $mm^2$/sec or more and 200 $mm^2$/sec or less.

* * * * *